United States Patent
Ishiguro et al.

(10) Patent No.: US 9,557,463 B2
(45) Date of Patent: Jan. 31, 2017

(54) OPTICAL FILM, POLARIZING PLATE AND LIQUID CRYSTAL DISPLAY DEVICE

(71) Applicant: FUJIFILM Corporation, Tokyo (JP)

(72) Inventors: Makoto Ishiguro, Kanagawa (JP); Shusuke Arita, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 5 days.

(21) Appl. No.: 14/199,424

(22) Filed: Mar. 6, 2014

(65) Prior Publication Data

US 2014/0254014 A1    Sep. 11, 2014

(30) Foreign Application Priority Data

Mar. 8, 2013  (JP) ................. 2013-046651
Apr. 5, 2013  (JP) ................. 2013-079969
Apr. 23, 2013 (JP) ................. 2013-090647

(51) Int. Cl.
*G02B 5/30* (2006.01)

(52) U.S. Cl.
CPC .................. *G02B 5/3083* (2013.01)

(58) Field of Classification Search
CPC .. G02B 1/04; G02B 1/10–1/12; G02B 5/3083; G02F 1/133502; G02F 1/133504; G02F 1/133528–1/133536; G02F 1/13363; G02F 1/133634; G02F 1/133638; G02F 2001/133531–2001/13355; G02F 2001/133635; B32B 27/30; B32B 27/308; B32B 2264/025; B32B 2333/04–2333/12; C09D 133/04–133/26

See application file for complete search history.

(56) References Cited

U.S. PATENT DOCUMENTS

| | | | | |
|---|---|---|---|---|
| 2007/0035681 A1* | 2/2007 | Okada | ............... | G02F 1/133528 349/97 |
| 2009/0135345 A1* | 5/2009 | Yajima | ............... | B29C 47/0021 349/96 |
| 2009/0153965 A1 | 6/2009 | Ito et al. | | |
| 2010/0270502 A1 | 10/2010 | Takimoto et al. | | |
| 2011/0058129 A1 | 3/2011 | Kubo et al. | | |
| 2011/0157524 A1 | 6/2011 | Kawanishi et al. | | |
| 2014/0253847 A1 | 9/2014 | Saneto et al. | | |

FOREIGN PATENT DOCUMENTS

| | | |
|---|---|---|
| EP | 2186847 A1 | 5/2010 |
| JP | 2006-267503 A | 10/2006 |
| JP | 2006-328334 A | 12/2006 |
| JP | 2009-249394 A | 10/2009 |
| JP | 2009-265365 A | 11/2009 |
| JP | 2011-154360 A | 8/2011 |
| JP | 2012-032768 A | 2/2012 |
| JP | 2014-219429 A | 11/2014 |
| WO | WO 2006/112207 A1 | 10/2006 |
| WO | 2009/047924 A1 | 4/2009 |
| WO | WO 2009/081607 A1 | 7/2009 |
| WO | WO 2009/139284 A1 | 11/2009 |
| WO | WO 2009/150910 A1 | 12/2009 |

OTHER PUBLICATIONS

Morishima et al., WO 2011/162204 A1, Optical Film, Manufacturing Method Therefor, and Polarizing Plate, Image Display Device, and 3D Image Display System Using Said Optical Film, Dec. 29, 2011.*
Morishima et al., WO 2011/162204, Published Dec. 29, 2011, English Machine Translation, Machine Translation made on May 22, 2015.*
Notification of Reasons for Refusal issued by the Japanese Patent Office (JPO) on Feb. 9, 2016 in connection with corresponding Japanese Patent Application No. 2013-090647.
Notification with Information Offer Form submitted by a third party issued on Oct. 20, 2015, in connection with corresponding Japanese Patent Application No. 2013-090647.
Office Action, issued by the Japanese Patent Office (JPO) on Oct. 4, 2016, in connection with corresponding Japanese Patent Application No. 2013-090647.

* cited by examiner

*Primary Examiner* — Stephone B Allen
*Assistant Examiner* — Adam W Booher
(74) *Attorney, Agent, or Firm* — Jean C. Edwards, Esq.; Edwards Neils LLC

(57) ABSTRACT

There is provided an optical film including an acrylic resin, wherein a tensile elastic modulus in a machine direction, which is abbreviated as an MD direction, and a tensile elastic modulus in a direction perpendicular to the machine direction, which is abbreviated as a TD direction, satisfy the relationship of Equation (1):

Tensile Elastic Modulus in the MD Direction/Tensile Elastic Modulus in the TD Direction>1.36    Equation (1).

9 Claims, No Drawings

OPTICAL FILM, POLARIZING PLATE AND LIQUID CRYSTAL DISPLAY DEVICE

CROSS-REFERENCE TO RELATED APPLICATION(S)

The present application claims priority from Japanese Patent Application Nos. 2013-046651 filed on Mar. 8, 2013, 2013-079969 filed on Apr. 5, 2013, and 2013-090647 filed on Apr. 23, 2013, the entire contents of which are incorporated herein by reference.

BACKGROUND

1. Field

The present invention relates to an optical film, a polarizing plate and a liquid crystal display device.

2. Description of Related Art

The liquid crystal device is a space-saving image display device with low electric power consumption, and the use thereof is increasing every year. A wide viewing angle liquid crystal mode such as a VA mode and an IPS mode is being put into practice, and accordingly, the demand for a liquid crystal display device is rapidly spreading even in the market where a high-quality image such as a television is required.

As the use of the liquid crystal display device is expanding, the liquid crystal display device has a large size and has been required to have a high-quality texture. Meanwhile, when having a large size, the liquid crystal display device becomes heavy. For weight reduction, thin film thickness of various members proceeds.

The liquid crystal display device is composed of a liquid crystal cell and polarizing plates provided on a viewing side (front side) and a backlight side (rear side) of a liquid crystal cell. Both the polarizing plates are bonded to substrates on both sides of the liquid crystal cell by means of an adhesive bond and the like. The polarizing plate used in the liquid crystal display device generally configured to include a polarizer which is composed of a polyvinyl alcohol (PVA) film and the like, on which iodine or a dye is adsorbed and aligned, and transparent protective films which are adhered to inner and outer sides thereof, but since the PVA is hydrophilic, the polarizer is sensitive to a change in temperature or humidity, and thus easily elongates due to a change in ambient environment. Due to the elongation of the polarizer, the polarizing plate (the laminated body of the optical film including the polarizer) elongates, and as a result, warpage occurs on a liquid crystal cell to which the polarizing plate is bonded, and a display unevenness (light leakage occurring on four corners of the liquid crystal cell) occurs on the liquid crystal display device. As various members have been recently thinned, light leakage due to warpage of the liquid crystal cell has become a trend.

RELATED APPLICATION(S)

International Publication No. WO2009/047924

From the viewpoint of securing transparency and adhesion with the PVA used in the polarizer, a cellulose acylate-based polarizing plate protective film has been widely used because adhesion with the PVA used in the polarizer may be easily secured, but the use of a polarizing plate protective film composed of an acrylic resin has been recently examined. Since the acrylic film composed of an acrylic resin has a lower water content ratio than a cellulose acylate-based film, it is expected that elongation of the polarizing plate due to entry of water (change in humidity) may be kept at a low level. Patent Document 1 discloses a polarizing plate protective film composed of an acrylic resin. However, it has been found that even in the polarizing plate protective film composed of the acrylic resin, the water content ratio is still high for the performance which may keep the shrinkage of the polarizing plate at a low level, and thus, the elongation of the polarizing plate is still high.

Since the water content ratio of a film composed of only an acrylic resin is approximately 1% (25° C., relative humidity 60%), the present inventors have thought that the film is effective for improving the elongation of the polarizing plate, and thus have studied the use of a polarizing plate protective film composed of the film. As a result, the present inventors have found that the film has a lower water content ratio than that of a polarizing plate protective film disclosed in Japanese Patent Application Laid-Open No. 2012-08417, and thus may reduce elongation of the polarizing plate. However, even the film may not sufficiently suppress elongation of the polarizing plate, and thus fails to sufficiently solve the problem of warpage of the liquid crystal cell.

SUMMARY

The present disclosure has been made in an effort to provide an optical film capable of solving the problem of light leakage based on warpage of a liquid crystal cell, which occurs when light is lit after the liquid crystal cell is stored in a high moisture environment.

[1] An optical film including an acrylic resin, wherein a tensile elastic modulus in a machine direction, which is abbreviated as an MD direction, and a tensile elastic modulus in a direction perpendicular to the machine direction, which is abbreviated as a TD direction, satisfy the relationship of Equation (1):

Tensile Elastic Modulus in the MD Direction/Tensile Elastic Modulus in the TD Direction>1.36.　　Equation (1)

[2] The optical film according to [1], wherein the tensile elastic modulus of the optical film in the MD direction is $1.70 \times 10^9$ to $5.5 \times 10^9$ N/m$^2$, and the tensile elastic modulus of the optical film in the TD direction is $1.2 \times 10^9$ to $4.0 \times 10^9$ N/m$^2$.

[3] The optical film according to [1], wherein an in-plane retardation value Re of the optical film, represented by Equation (i), and a retardation value in a thickness-direction Rth of the optical film, represented by Equation (ii), satisfy Equation (iii) and Equation (iv):

$$Re = (nx - ny) \times d \quad \text{(i)}$$

$$Rth = ((nx + ny)/2 - nz) \times d \quad \text{(ii)}$$

$$0 \le Re < 20 \quad \text{(iii)}$$

$$|Rth| \le 25, \quad \text{(iv)}$$

wherein nx is a refractive index in an in-plane slow axis direction of the optical film, ny is a refractive index in an in-plane fast axis direction of the optical film, nz is a refractive index in a thickness-direction of the optical film, and d is a thickness (nm) of the optical film.

[4] The optical film according to [1], wherein at least one layer of a pattern phase difference layer, a λ/4 layer, an optically anisotropic layer, a hardcoat layer, an antiglare layer, an antireflection layer, an antistatic layer, or an adhesive layer is provided on a surface of the optical film.

[5] A polarizing plate including: a polarizer; and the optical film according to claim 1 on at least one surface of the polarizer.

[6] A polarizing plate including: a polarizer; and the optical film according to claim 1 on both surfaces of the polarizer.

[7] A liquid crystal display device including at least one polarizing plate according to [5].

[8] A liquid crystal display device including at least one polarizing plate according to [6].

Hereinafter, means for solving the problem of the present invention will be described in more detail.

By stretching a film in a machine direction (MD direction, the molecular alignment of a resin is enhanced, and tensile elastic modulus of the film in the MD direction is increased. Meanwhile, the humidity dimensional change rate in the MD direction is reduced by enhancing the molecular alignment of the resin. The present inventors have assumed that this is because the aforementioned result makes it difficult for water to enter a space between molecules in the MD direction, and accordingly, an effect of substantially reducing a water content ratio is also exhibited. In addition, the present inventors have found that force generated by the elongation of a polarizing plate is determined by a product of a film thickness, a tensile elastic modulus, and a dimensional change rate of a film and a polarizer, which constitute the polarizing plate, and the elongation of the polarizing plate may be effectively suppressed by designing a product of a film thickness, a tensile elastic modulus and a dimensional change rate of the optical film constituting the polarizing plate. An increase in tensile elastic modulus and a reduction in dimensional change rate act in a direction which reinforces the elongation force of the optical film and in a direction which makes the elongation force of the optical film weaker, respectively. When a film composed of an acrylic resin is stretched in the MD direction, an effect of reducing the dimensional change rate of the optical film in the MD direction may be more significant than an effect by an increasing in the tensile elastic modulus of the optical film in the MD direction, thereby making weaker force generated by elongation. Meanwhile, when the film is stretched in the MD direction, force, which is generated by shrinkage of the polarizing plate in a direction (TD direction) perpendicular to the MD direction becomes rather stronger. Here, it is known that the liquid crystal cell is easily warped in the longitudinal direction.

Typically, since in the liquid crystal display device, the crossed Nichol is disposed for the polarizer, the longitudinal direction of the polarizing plate on the front side corresponds to the MD direction of the film, and the longitudinal direction of the polarizing plate on the rear side corresponds to the TD direction of the film. Since warpage of the liquid crystal cell is generated by a difference between force generated by shrinkage of the polarizing plate on the front side and force generated by shrinkage of the polarizing plate on the rear side, the present inventors have assume that it is possible to reduce the amount of warpage of the liquid crystal cell by combining the polarizing plate on the front side and the polarizing plate on the rear side using an optical film stretched in the MD direction. Further, when an acrylic film, in which a ratio of tensile elastic modulus in the MD direction/tensile elastic modulus in the TD direction is more than 1.36, is used, it is possible to clearly reduce display unevenness of the liquid crystal display device, which occurs according to warpage of the liquid crystal cell as compared to the case where an acrylic film in the related art (the tensile elastic modulus ratio is in the order of 1.08 even at maximum) is used.

According to the present invention, it is possible to provide a liquid crystal display device, which solves the problem of light leakage based on warpage of a liquid crystal cell, which occurs when light is lit after the liquid crystal cell is stored in a high moisture environment.

DETAILED DESCRIPTION OF EXEMPLARY EMBODIMENTS

An optical film of the present invention is composed of an acrylic resin.

The acrylic resin is a concept including a methacrylic resin, and also includes derivatives of acrylate/methacrylate, and particularly (co)polymers of acrylate ester/methacrylate ester.

The acrylic resin also includes an acryl-based resin having a ring structure in a main chain thereof in addition to methacrylic resins, and includes a polymer having a lactone ring, a maleic anhydride-based polymer having a succinic anhydride ring, a polymer having a glutaric anhydride ring, and a glutarimide ring-containing polymer.

In addition, "composed of an acrylic resin" indicates that an acryl-based resin is included in an amount of 70% by mass or more in an optical film, and an acryl-based resin is included in an amount of preferably 80% by mass or more, and more preferably 90% by mass or more in an optical film.

(Acrylic Resin)

The repeating structural unit of the acrylic resin is not particularly limited. It is preferred that the acrylic resin has a repeating structural unit derived from an acrylic acid ester monomer as a repeating structural unit.

The acrylic acid ester is not particularly limited, but examples thereof include acrylic acid ester such as methyl acrylate, ethyl acrylate, n-butyl acrylate, isobutyl acrylate, t-butyl acrylate, cyclohexyl acrylate, and benzyl acrylate; methacrylic acid ester such as methyl methacrylate, ethyl methacrylate, propyl methacrylate, n-butyl methacrylate, isobutyl methacrylate, t-butyl methacrylate, cyclohexyl methacrylate, and benzyl methacrylate; and the like, and these may be used either alone or in combination of two or more thereof. Among them, methyl methacrylate is particularly preferred from the viewpoint of excellent heat resistance and transparency.

When the acrylic acid ester is used as a main component, the content thereof in the monomer component used in the polymerization process is preferably 50 to 100% by mass, more preferably 70 to 100% by mass, still more preferably 80 to 100% by mass, and particularly preferably 90 to 100% by mass, in order to sufficiently exhibit the effect of the present invention.

It is preferred that the glass transition temperature (Tg) of a resin having the acrylic acid ester as a main component is in a range of 80° C. to 120° C.

The weight average molecular weight of the resin having the acrylic acid ester as a main component is preferably in a range of 50,000 to 500,000.

—Acrylic Resin Having Ring Structure in Main Chain—

Among the acrylic resins, preferred is an acrylic resin having a ring structure in a main chain thereof. Heat resistance may be improved by introducing a ring structure into the main chain to increase stiffness of the main chain.

In the present invention, among the acrylic resins having a ring structure in a main chain thereof, preferred is any one of a polymer containing a lactone ring structure in a main chain thereof, a maleic anhydride-based polymer having a succinic anhydride ring in a main chain thereof, a polymer having a glutaric anhydride ring structure in a main chain thereof, and a polymer having a glutarimide ring structure in a main chain thereof. Among them, a polymer containing a lactone ring structure in a main chain thereof and a polymer having a glutarimide ring structure in a main chain thereof are more preferred.

Hereafter, these polymers having a ring structure in a main chain thereof will be sequentially described.

(1) Acrylic Resin Having Lactone Ring Structure in Main Chain Thereof

The acrylic resin having a lactone ring structure in a main chain thereof (hereinafter, also referred to as a lactone ring-containing polymer) is not particularly limited as long as the acrylic resin is an acrylic resin having a lactone ring in a main chain thereof, but preferably has a lactone ring structure represented by the following Formula (100).

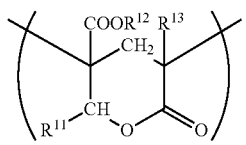

Formula (100)

In Formula (100), $R^{11}$, $R^{12}$ and $R^{13}$ each independently represent a hydrogen atom or an organic residue having 1 to 20 carbon atoms, and the organic residue may contain a hydrogen atom.

Here, as the organic residue having 1 to 20 carbon atoms, an alkyl group having 1 to 6 carbon atoms is preferred, and specifically, a methyl group, an ethyl group, an isopropyl group, an n-butyl group, a t-butyl group, and the like are preferred.

The content ratio of the lactone ring structure represented by Formula (100) in the lactone ring-containing polymer structure is preferably 5 to 90% by mass, more preferably 10 to 70% by mass, still more preferably 10 to 60% by mass, and particularly preferably 10 to 50% by mass. By setting the content ratio of the lactone ring structure to 5% by mass or more, the obtained polymer tends to have improved heat resistance and surface hardness, and by setting the content ratio of the lactone ring structure to 90% by mass or less, the obtained polymer tends to have improved molding processability.

Meanwhile, the content ratio of the lactone ring structure may be calculated by the following Formula.

Content ratio(% by mass) of the lactone ring=$B \times A \times M_R/M_m$ (In the formula, B is a mass-containing ratio in the composition of the monomer used in the copolymerization of a raw material monomer having a structure (a hydroxyl group) involved in the lactone cyclization, MR is a formula weight of a lactone ring structural unit to be produced, Mm is a molecular weight of a raw material monomer having a structure (a hydroxyl group) involved in the lactone cyclization, and A is a lactone cyclization ratio)

The lactone cyclization ratio may be calculated from a weight reduction and addition heat and weight reduction ratio by a dealcoholization reaction from 150° C. before a theoretical weight loss amount and a weight loss are initiated to 300° C. before decomposition of the polymer is initiated, for example, when the cyclization reaction is accompanied by the alcoholization reaction.

A method of preparing the acrylic resin having a lactone ring structure is not particularly limited. Preferably, the acrylic resin having a lactone ring structure is obtained by polymerizing the following predetermined monomer to obtain a polymer (p) having a hydroxyl group and an ester group in the molecular chain thereof, and then subjecting the obtained polymer (p) to heat treatment in a temperature range of 75° C. to 120° C. to perform the lactone cyclization condensation of introducing a lactone ring structure into the polymer.

In the polymerization process, a polymer having a hydroxyl group and an ester group in a molecular chain thereof is obtained by performing a polymerization reaction of a monomer component including a monomer represented by the following Formula (101).

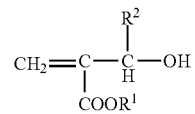

Formula (101)

(In the formula, $R^1$ and $R^2$ each independently represent a hydrogen atom or an organic residue having 1 to 20 carbon atoms.)

Examples of the monomer represented by Formula (101) include 2-(hydroxymethyl)methyl acrylate, 2-(hydroxymethyl)ethyl acrylate, 2-(hydroxymethyl)isopropyl acrylate, 2-(hydroxymethyl)n-butyl acrylate, 2-(hydroxymethyl)$_t$-butyl acrylate, and the like. Among them, 2-(hydroxymethyl)methyl acrylate and 2-(hydroxymethyl)ethyl acrylate are preferred, and in terms of a high effect of improving heat-resistance, 2-(hydroxymethyl)methyl acrylate is particularly preferred. The monomer represented by Formula (101) may be used either alone or in combination of two or more thereof.

The content ratio of the monomer represented by Formula (101) in the monomer component used in the polymerization process has a lower limit in a preferred range from the viewpoint of heat resistance, solvent resistance and surface hardness, and an upper limit in a preferred range from the viewpoint of molding processability of the obtained polymer, and is preferably 5 to 90% by mass, more preferably 10 to 70% by mass, still more preferably 10 to 60% by mass, and particularly preferably 10 to 50% by mass, based on these viewpoints.

The monomer component used in the polymerization process may include a monomer other than the monomer represented by Formula (101). The monomer is not particularly limited, but preferred examples thereof include acrylic acid ester, a hydroxyl group-containing monomer, an unsaturated carboxylic acid, and a monomer represented by the following Formula (102). The monomer other than the monomer represented by Formula (101) may be used either alone or in combination of two or more thereof.

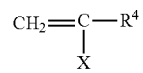

Formula (102)

(In the formula, $R^4$ represents a hydrogen atom or a methyl group, X represents a hydrogen atom, an alkyl group having 1 to 20 carbon atoms, an aryl group, an —OAc group, a —CN group, a —CO—R⁵ group or a —CO—R⁶ group, Ac represents an acetyl group, and $R^5$ and $R^6$ represent a hydrogen atom or an organic residue having 1 to 20 carbon atoms.)

The weight average molecular weight of the lactone-containing polymer is preferably 10,000 to 2,000,000, more preferably 20,000 to 1,000,000, and particularly preferably 50,000 to 500,000.

The mass reduction ratio of the lactone-ring containing polymer is preferably 1% or less, more preferably 0.5% or less, and still more preferably 0.3% or less in a range of 150° C. to 300° C. in the dynamic TG measurement thereof. With respect to the dynamic TG measurement method, it is possible to use a method described in Japanese Patent Application Laid-Open No. 2002-138106.

Since the lactone ring-containing polymer has a high cyclization condensation reaction ratio, the dealcoholization reaction rarely occurs during the manufacturing process of molded articles, and thus it is possible to avoid a drawback in that bubbles or silver streaks enter the molded articles after the molding resulting from this alcohol. Furthermore, since the lactone ring structure is sufficiently introduced into the polymer due to high cyclization condensation reaction ratio, the obtained lactone ring-containing polymer has high heat resistance.

When the lactone ring-containing polymer is prepared with a chloroform solution at a concentration of 15% by mass, the coloring degree (YI) thereof is preferably 6 or less, more preferably 3 or less, still more preferably 2 or less, and particularly preferably 1 or less. When the coloring degree (YI) is 6 or less, the lactone ring-containing polymer may be preferably used in the present invention because it is difficult for problems such as damage to transparency due to colorization to occur.

For the lactone ring-containing polymer, a 5% mass decreasing temperature in the thermogravimetric analysis (TG) is preferably 330° C. or more, more preferably 350° C. or more, and still more preferably 360° C. or more. The 5% mass decreasing temperature in the thermogravimetric analysis (TG) is an index of thermal stability, and when this value is set to 330° C. or more, sufficient thermal stability tends to be easily exhibited. For the thermogravimetric analysis, the dynamic TG measurement device may be used.

The glass transition temperature (Tg) of the lactone ring-containing polymer is preferably 115° C. to 180° C., more preferably 120° C. to 170° C., and still more preferably 125° C. to 160° C.

(2) Maleic Anhydride-Based Polymer Having Succinic Anhydride Ring in Main Chain Thereof A succinic anhydride structure in a main chain is formed in a molecular chain (in a main structure of the polymer) of the polymer, and thus high heat resistance is imparted to an acrylic resin which is a copolymer, and the glass transition temperature (Tg) is also increased, which is preferred.

The glass transition temperature (Tg) of the maleic anhydride-based polymer having a succinic anhydride ring in a main chain thereof is preferably 110° C. to 160° C., more preferably 115° C. to 160° C., and still more preferably 120° C. to 160° C.

The weight average molecular weight of the maleic anhydride-based polymer having a succinic anhydride ring in a main chain thereof is preferably in a range of 50,000 to 500,000.

The maleic anhydride unit used in the copolymerization with the acrylic resin is not particularly limited, but examples thereof include a maleic acid-modified resin described in Japanese Patent Application Laid-Open Nos. 2008-216586, 2009-052021 and 2009-196151, and Japanese Unexamined Patent Application Publication No. 2012-504783.

Meanwhile, it is not intended to limit the present invention thereto.

As a commercially available product of the maleic acid-modified resin, DELPET 980N manufactured by Asahi Kasei Chemicals Corporation as a maleic acid-modified MAS resin (a methyl methacrylate-acrylonitrile styrene copolymer) may be preferably used.

Further, as a method of preparing an acrylic resin including maleic anhydride unit, a publicly known method may be used without a particular limitation.

The maleic acid-modified resin is not limited as long as the resin includes a maleic anhydride unit in the polymer obtained, and examples thereof include an (anhydrous) maleic acid-modified MS resin, (anhydrous)maleic acid-modified MAS resin (a methyl methacrylate-acrylonitrilestyrene copolymer), an (anhydrous)maleic acid-modified MBS resin, an (anhydrous)maleic acid-modified AS resin, an (anhydrous)maleic acid-modified AA resin, an (anhydrous)maleic acid-modified ABS resin, an ethylene-maleic anhydride copolymer, an ethylene-acrylic acid-maleic anhydride copolymer, a maleic anhydride grafted polypropylene and the like.

The maleic anhydride unit is a structure represented by the following Formula (200).

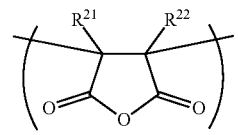

Formula (200)

In Formula (200), $R^{21}$ and $R^{22}$ each independently represent a hydrogen atom or an organic residue having 1 to 20 carbon atoms.

The organic residue is not particularly limited as long as the organic residue has carbon atoms in a range of 1 to 20, but examples thereof include a straight or branched alkyl group, a straight or branched alkylene group, an aryl group, an —OAc group, a —CN group and the like. In addition, the organic residue may include an oxygen atom. Ac represents an acetyl group.

$R^{21}$ and $R^{22}$ have preferably 1 to 10 carbon atoms, and more preferably 1 to 5 carbon atoms.

When $R^{21}$ and $R^{22}$ each represent a hydrogen atom, it is also preferred that the organic residue further include other copolymerization components from the viewpoint of adjusting the intrinsic birefringence. As a 3- or more-membered heat resistant acrylic resin, for example, a methyl methacrylate-maleic anhydride-styrene copolymer may be preferably used.

(3) Polymer Having Glutaric Anhydride Ring Structure in Main Chain Thereof

A polymer having a glutaric anhydride ring structure in a main chain thereof refers to a polymer having a glutaric anhydride unit.

It is preferred that the polymer having a glutaric anhydride unit has a glutaric anhydride unit (hereinafter, referred to as a glutaric anhydride unit) represented by the following Formula (300).

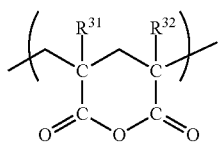

Formula (300)

In Formula (300), $R^{31}$ and $R^{32}$ each independently represent a hydrogen atom or an organic residue having 1 to 20 carbon atoms. Meanwhile, the organic residue may include an oxygen atom. $R^{31}$ and $R^{32}$ particularly preferably represent a hydrogen atom or an alkyl group having 1 to 5 carbon atoms, which may be the same or different.

It is preferred that the polymer having a glutaric anhydride unit is an acrylic resin containing a glutaric acid anhydride unit. It is preferred that the acrylic resin has a glass transition temperature (Tg) of 120° C. or more from the viewpoint of heat resistance.

The glass transition temperature (Tg) of the polymer having an anhydrous a glutaric acid ring structure in a main chain thereof is preferably 110° C. to 160° C., more preferably 115° C. to 160° C., and still more preferably 120° C. to 160° C.

The weight average molecular weight of the polymer having a glutaric anhydride ring structure in a main chain thereof is preferably in a range of 50,000 to 500,000.

The content of the glutaric anhydride unit based on the acrylic resin is preferably 5 to 50% by mass, and more preferably 10 to 45% by mass. By setting the content to 5% by mass or more, and more preferably 10% by mass or more, it is possible to obtain an effect of enhancing heat resistance, and furthermore, it is also possible to obtain an effect of enhancing weather resistance.

(4) Acrylic Resin Having Glutarimide Ring Structure in Main Chain Thereof

The acrylic resin having a glutarimide ring structure in a main chain thereof (hereinafter, also referred to as a glutarimide-based resin) may have a glutarimide ring structure in a main chain thereof, thereby exhibiting a preferred characteristic balance in terms of optical characteristics, heat resistance, or the like. It is preferred that the acrylic resin having a glutarimide ring structure in a main chain thereof at least contains a glutarimide resin having 20% by mass or more of a glutarimide unit (however, in the formula, $R^{301}$, $R^{302}$ and $R^{303}$ are independently hydrogen, or an alkyl group, an cycloalkyl group and an aryl group having 1 to 12 carbon atoms, which are unsubstituted or substituted) represented by the following Formula (400).

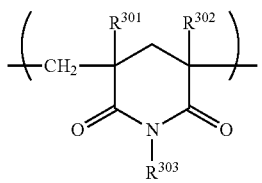

Formula (400)

In a preferred glutarimide unit constituting the glutarimide-based resin used in the present invention, $R^{301}$ and $R^{302}$ are hydrogen or a methyl group, and $R^{303}$ is a methyl group or a cyclohexyl group. The glutarimide unit may be a single type, and may allow $R^{301}$, $R^{302}$ and $R^{303}$ to include a plurality of other types.

A preferred second constitutional unit constituting the glutarimide-based resin used in the present invention is a unit composed of acrylic acid ester or methacrylic acid ester. Examples of the preferred acrylic acid ester or methacrylic acid ester constitutional unit include methyl acrylate, ethyl acrylate, methyl methacrylate, and the like. Furthermore, other examples of preferred imidizable units include N-alkyl methacrylamide such as N-methyl methacrylamide or N-ethyl methacrylamide. These second constitutional units may be a single type, or may include a plurality of types.

The content of the glutarimide unit represented by Formulglutarimide-based resin is preferably 20% by mass to 95% by mass based on the total repeating unit of the glutarimide-based a (400) in the resin. The content is more preferably 50 to 90% by mass, and still more preferably 60 to 80% by mass. When the content of the glutarimide unit is set to 20% by mass or more, the content is preferred in terms of securing heat resistance and transparency of the film obtained. When the content is set to 95% by mass or less, the content is preferred from the viewpoint of brittleness, transparency and forming a film.

The glutarimide-based resin may be a resin in which a third constituent unit is further copolymerized, if necessary. As an example of the preferred third constitutional unit, it is possible to use a constitutional unit obtained by copolymerizing a styrene-based monomer such as styrene, substituted styrene or α-methylstyrene, an acrylic monomer such as butyl acrylate, a nitrile-based monomer such as acrylonitrile or methacrylonitrile, and a maleimide-based monomer such as maleimide, N-methylmaleimide, N-phenylmaleimide, and N-cyclohexylmaleimide. These constitutional units may be directly copolymerized with a glutarimide unit and an imidizable unit in the glutarimide-based resin, and may also be graft-copolymerized with a rein having the glutarimide unit and the imidizable unit. When the third component is added thereto, the content ratio of the third component in the glutarimide-based resin is preferably 5% by mol to 30% by mol based on the total repeating unit in the glutarimide-based resin.

The glutarimide-based resin is described in U.S. Pat. Nos. 3,284,425 and 4,246,374 and Japanese Patent Application Laid-Open No. H2-153904, and the like, and may be obtained by using, as a resin having an imidizable unit, a resin obtained by using methacrylic acid methyl ester and the like as a main raw material, and imidizing the resin having an imidizable unit using ammonia or substituted amine. When the glutarimide-based resin is obtained, there is a case where a unit composed of acrylic acid or methacrylic acid or anhydride thereof as a reaction byproduct is introduced into the glutarimide-based resin. The presence of the constitutional unit, particularly, acid anhydride reduces total light transmittance or haze of the film of the present invention to be obtained, and thus is not preferred. The content of acrylic acid or methacrylic acid is 0.5 milliequivalent or less per 1 g, preferably 0.3 milliequivalents or less per 1 g, and more preferably 0.1 milliequivalents or less per 1 g, of the resin. Furthermore, as can be seen in Japanese Patent Application Laid-Open No. H02-153904, it is also possible to obtain a glutarimide-based resin through imidization using a resin usually composed of N-methylacrylamide and methacrylic acid methylester.

The glass transition temperature (Tg) of the glutar-based resin is preferably 110° C. to 160° C., more preferably 115° C. to 160° C., and still more preferably 120° C. to 160° C.

The weight average molecular weight of the glutar-based resin is preferably in a range of 50,000 to 500,000.

In the optical film of the present invention, other resins may be mixed in addition to the acrylic resin. The mass ratio of the acrylic resin to the other resins is preferably 70:30 to 100:0, more preferably 80:20 to 100:0, still more preferably 90:10 to 100:0, particularly preferably 98:2 to 100:0, and most preferably 100:0. When the mass ratio of the acrylic resin to the another resin is in a range of 80:20 to 100:0, the mass ratio is preferred because due to low moisture permeability, it is possible to further suppress humidity expansion of the polarizer by water which permeates the film.

—Method of Preparing Optical Film Composed of Acrylic Resin—

Hereinafter, a preparation method of film-forming a thermoplastic resin composed of an acrylic resin will be described in detail.

In order to film-form an optical film using an acrylic resin as a main component, for example, film raw materials are pre-blended by using the mixer publicly known in the related art, such as an omni mixer, and then the mixture obtained is extrusion-kneaded. In this case, the mixer used for the extrusion kneading is not particularly limited, but the mixer publicly known in the related art, for example, an extruder such as a single-screw extruder and a twin-screw extruder, and a pressure kneader may be used.

Examples of a method of forming a film include film formation methods publicly known in the related art, such as a solution cast method (solution casting methods), a melt extrusion method, a calendering method, and a compression formation method. In these film formation methods, the melt extrusion method is particularly suitable.

Examples of the extrusion method include a T-die method and an inflation methods, and in this case, the film formation temperature may be appropriately controlled according to the glass transition temperature of the film raw materials, and is not particularly limited, but is, for example, preferably 150° C. to 350° C., and more preferably 200° C. to 300° C.

When a film is formed by the T-die method, a film having a roll shape may be obtained by attaching a T-die to the top end of a publicly known single-screw extruder or twin-screw extruder, and winding a film extruded in a film form. At this time, it is also possible to carry out a uniaxial stretching by appropriately controlling the temperature of wound rolls to stretch the film in the direction of extrusion. Further, it is also possible to carry out simultaneous biaxial stretching or sequential biaxial stretching by stretching the film in a direction perpendicular to the direction of extrusion.

The optical film of the present invention is preferably a stretched film composed of an acrylic resin. When the film is a stretched film, the film may be either a uniaxial stretched film or a biaxial stretched film. When the film is a biaxial stretched film, the film may be either a simultaneously biaxially stretched film or a sequentially biaxially stretched film. When the film is biaxially stretched, mechanical strength of the film is improved, thereby improving the performance of the film.

The thickness of the optical film composed of an acrylic resin is preferably 5 μm to 80 μm, and more preferably 10 μm to 40 μm. When the thickness is 5 μm or more, the film strength may be improved, and durability (crimp) may be suppressed, which is preferred. By setting the thickness to 80 μm or less, transparency of the film may be secured and appropriate moisture permeability may be secured, which is preferred.

The optical film of the present invention satisfies the relationship of Equation (1) in the tensile elastic modulus in a machine direction (MD direction) and the tensile elastic modulus in a direction (TD direction) perpendicular to the machine direction.

Tensile elastic modulus in MD direction/Tensile elastic modulus in TD direction>1.36   Equation (1)

The relationship is more preferably in a range of 1.36<Tensile elastic modulus in MD direction/Tensile elastic modulus in TD direction<1.80.

When an acrylic film, in which a ratio of tensile elastic modulus in the machine direction (MD direction)/tensile elastic modulus in a direction (TD direction) perpendicular to the machine direction is more than 1.36, is used, it is possible to clearly reduce display unevenness of the liquid crystal display device, which occurs due to warpage of the liquid crystal cell as compared to the case where an acrylic film in the related art (the tensile elastic modulus ratio is in the order of 1.08 even at maximum) is used.

The display unevenness occurring in the liquid crystal display device refers to planar failure generated by contact of four corners of the liquid crystal cell with a bezel and the like as a result of warpage of the liquid crystal cell. The liquid crystal cell of the liquid crystal display device has two polarizing plates on both surfaces thereof. For example, when the liquid crystal display device is placed in a high moisture environment, any polarizing plate on the front side and on the rear side contains water and is swollen. Thereafter, when the liquid crystal display device is taken out from the high moisture environment, the polarizing plate, which contains water and is swollen, is dried and shrinked. Here, since the polarizing plate on the rear side is disposed in the liquid crystal display device and placed in an environment which is higher in airtightness than the polarizing plate on the front side, and the like, the polarizing plate on the front side is dried faster than the polarizing plate on the rear side, and accordingly, larger shrinkage force is generated on the front side, while the polarizing plate on the rear side is slowly dried, and accordingly, small shrinkage force is generated. For that reason, in order to effectively reduce display unevenness, it is preferred that an optical film satisfying the relationship of Equation (1) is used in the polarizing plate on the front side, it is more preferred that the optical film is an optical film in which two optical films far from the liquid crystal cell satisfy the relationship of Equation (1) among four optical films used in the polarizing plate on the front side and the polarizing plate on the rear side, and it is still more preferred that the optical film is an optical film in which all the four optical films used in the polarizing plate on the front side and the polarizing plate on the rear side satisfy the relationship of Equation (1).

When the optical film of the present invention is used in the polarizing plate on the front side, it is preferred that the polarizing plate is disposed such that the machine direction (MD direction) is a long side direction (typically a crosswise direction) of the display surface of the liquid crystal display device, and when the optical film of the present invention is used in the polarizing plate on the rear side, it is preferred that the polarizing plate is disposed such that the machine direction (MD direction) is a short side direction (typically an upper and lower direction) of the display surface of the liquid crystal display device.

A large size and thin thickness of the liquid crystal display device have been recently proceeding and the use thereof is also diversified, and accordingly, durability has been rigorously required. For example, as the thin thickness of the liquid crystal display device has proceeds, there is a problem in that circular or elliptical light unevenness occurs on the display surface, and accordingly, improvement has been required for the problem. Examples of a cause for the occurrence of light unevenness include the fact that backlight members are easily brought in contact with the polarizing plate on the backlight side of liquid crystal panel members by thin thickness. When the liquid crystal display device is used for a long period of time in a state where backlight members are brought into contact with the polarizing plate on the backlight side, or used in a high temperature and highly humid environment, it is thought that moisture is easily gathered at the contact part and the elongation amount of the polarizing plate at contact and non-contact parts of a backlight member and the polarizing plate on the backlight side is changed by permeation of the moisture into the polarizer, and as a result, the phase difference is exhibited by photoelastic characteristics, thereby generating light unevenness. Since the photoelastic coefficient of an optical film composed of an acrylic resin is in the vicinity of 0 Br, the phase difference due to photoelastic characteristics is not exhibited. For that reason, the light unevenness may be significantly reduced by using an optical film composed of an acrylic resin on the liquid crystal cell side of the polarizing plate on the rear side.

The tensile elastic modulus in the machine direction (MD direction) of the optical film of the present invention is more preferably $1.7 \times 10^9$ to $5.5 \times 10^9$ N/m², still more preferably $2.0 \times 10^9$ to $5.5 \times 10^9$ N/m², and particularly preferably $2.5 \times 10^9$ to $5.5 \times 10^9$ N/m². The tensile elastic modulus in a direction (TD direction) perpendicular to the machine direction (MD direction) of the optical film of the present invention is more preferably $1.2 \times 10^9$ to $4.0 \times 10^9$ N/m², still more preferably $1.2.0 \times 10^9$ to $3.5 \times 10^9$ N/m², and particularly preferably $1.2 \times 10^9$ to $3.2 \times 10^9$ N/m².

In general, the higher the tensile elastic modulus is, the more difficult it is for scratch to occur when the surface of the polarizing plate is scraped off. That is, when the ratio of the tensile elastic modulus MD/TD is high (MD tensile elastic modulus is high), scratch resistance in the MD direction may be enhanced, which is preferred. For example, since it is difficult for scratch to occur during the roll conveying in the manufacture of a polarizing plate, the yield during the roll conveying may be enhanced.

In the optical film of the present invention, it is preferred that the film in-plane retardation value (Re) of the film represented by $Re = (nx - ny) \times d$ is 0 nm ≤ Re ≤ 20 nm 0 nm ≤ Re ≤ 15 nm is more preferred, and 0 nm ≤ Re ≤ 10 nm is still more preferred.

In the optical film of the present invention, it is preferred that the retardation value (Rth) in a thickness-direction of the film represented by $Rth = ((nx + ny)/2 - nz) \times d$ is |Rth| ≤ 25 nm |Rth| ≤ 20 nm is more preferred, |Rth| ≤ 10 nm is still more preferred, and −10 nm ≤ Rth ≤ 5 nm is most preferred.

In the present specification, Re (λ nm) and Rth (λ nm) represent an in-plane retardation and a retardation in a thickness-direction at a wavelength of λ (unit; nm), respectively. Re (λ nm) is measured by irradiating with an incident light having a wavelength of λ nm to the normal direction of the film using KOBRA 21ADH or WR (manufactured by Oji Scientific Instruments Inc.). In the selection of the measurement wavelength λ nm, measurement may be performed by replacing a wavelength selective filter manually or converting measured values using a program or the like. When a film to be measured is represented by a uniaxial or biaxial refractive index ellipsoid, Rth (λ nm) is calculated by the following method.

A total of six points of the Re (λ nm) are measured by irradiating with an incident light having a wavelength of λ nm from each of the inclined directions at an angle increasing in 10° step increments up to 50° in one direction from the normal direction of the film with respect of the normal direction of the film by using the in-plane slow axis (decided by KOBRA 21ADH or WR) as an inclined axis (rotation axis) (when there is no slow axis, any in-plane direction of the film is used as a rotation axis), and then Rth (λ nm) is calculated by KOBRA 21ADH or WR based on the retardation value measured, the assumed value of the average refractive index, and the film thickness value inputted.

When λ is not particularly described and only described with Re and Rth in the above description, the values indicate those measured by using light having a wavelength of 550 nm. Further, in the case of a film having a direction in which a retardation value is zero at a certain tilt angle from the normal direction by taking the in-plane slow axis as a rotation axis, a retardation value at a tilt angle greater than that certain tilt angle is changed into a minus sign, and then is calculated by KOBRA 21ADH or WR.

Meanwhile, retardation values are measured in any inclined two directions by taking the slow axis as an inclined axis (rotation axis) (when there is no slow axis, any in-plane direction of the film will be taken as a rotation axis), and then the Rth may also be calculated based on the retardation values, the assumed value of the average refractive index, and the film thickness inputted and from the following Equations (3) and (4).

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad \text{Equation (3)}$$

[In the equation, Re(θ) represents a retardation value in a direction inclined by an angle (θ) from the normal direction. Further, nx represents a refractive index in an in-plane slow axis direction; ny represents a refractive index in an in-plane direction orthogonal to nx, nz represents a refractive index in a thickness-direction perpendicular to nx and ny, and d represents a film thickness.]

$$Rth = ((nx + ny)/2 - nz) \times d \quad \text{Equation (4):}$$

Meanwhile, in the aforementioned measurements, values described in Polymer Handbook (John Wiley & Sons, Inc.) and catalogues of various optical films may be used as the hypothetical value of the average refractive index. The average refractive index whose value is not known already may be measured by an Abbe refractometer. Main values of average refractive indices of optical films are exemplified below: Cellulose acylate (1.48), cycloolefin polymer (1.52), polycarbonate (1.59), polymethyl methacrylate (1.49) and polystyrene (1.59).

<Polarizing Plate>

A polarizing plate of the present invention has a polarizer and the optical film of the present invention on at least one surface of the polarizer. It is preferred that the polarizing plate of the present invention has the optical film of the present invention on both surfaces of the polarizer.

It is preferred that the polarizer and the optical film of the present invention as a protective film of the polarizer, and as a configuration of the polarizing plate, a protective film/a polarizer/a protective film, a protective film/a polarizer, or a protective film/a polarizer, a protective film/a polarizer/a coating layer is preferred.

With respect to a polarizing plate protective film constituting the polarizing plate of the present invention, there is no particular limitation on a material which may be used in the protective film other than the optical film of the present invention. The protective film may be a layer or film (hereinafter, also collectively referred to as "film" in some cases) made of various polymers, and it is possible to use, for example, cellulose acylate-based polymers, polycarbonate-based polymers, polysterster-based polymers such as polyethylene terephthalate and polyethylene naphthalate, acrylic polymers such as polymethyl methacrylate, styrene-based polymers such as polystyrene or acrylonitrile.styrene copolymers (AS resins), and the like. In addition, one or two or more polymers are selected from polyolefin-based polymers, such as polyolefins such as polyethylene and polypropylene and ethylene.propylene copolymers, cycloolefin-based polymers, vinyl chloride-based polymers, amide-based polymers such as nylon and aromatic polyamides, imide-based polymers, sulfone-based polymers, polyether sulfone-based polymers, polyether ether ketone-based polymers, polyphenylene sulfide-based polymers, chloride vinylidene-based polymers, vinyl alcohol-based polymers, vinyl butyral-based polymers, arylate-based polymers, polyoxymethylene-based polymers, epoxy-based polymers, or polymer mixtures of the above polymers and the like, and the polymers may be used as main components to prepare a polymer layer or film. Furthermore, the protective film may be a layer formed by polymerizing a rod-like liquid crystal or a discotic liquid crystal having a polymerizable group in a predetermined alignment state, and fixing the liquid crystal.

In polarizing plate of the present invention, when the other optical film is adhered on a surface opposite to the surface on which the polarizer is adhered to the optical film of the present invention, the other optical film may have a functional layer. In order to improve adhesion with the polarizer or another functional layer, another optical film may have an easily adhesive layer as a functional layer.

The polarizing plate of the present invention may be manufactured by a general method. For example, a method of laminating a polarizer and the optical film of the present invention is used.

In the lamination, a typical adhesive bond is used. An adhesive bond layer between the polarizer and the polarizing plate protective films on both surfaces may be set to have a thickness from 0.01 µm to 30 µm, and preferably 0.01 µm to 10 µm, and more preferably 0.05 µm to 5 µm. Since the thickness of the adhesive bond layer in this range does not cause lifting nor peeling between the polarizing plate protective film and the polarizer to be laminated, bond strength without a practical problem may be obtained.

Examples of one preferred adhesive bond include water-based adhesive bonds, that is, those in which adhesive bond components are dissolved or dispersed in water, and an adhesive bond composed of a polyvinyl alcohol-based resin aqueous solution is preferably used.

In the adhesive bond composed of a polyvinyl alcohol-based resin aqueous solution, examples of the polyvinyl alcohol-based resin include vinyl alcohol homopolymers obtained by performing saponification of polyvinyl acetate, which is a homopolymer of vinyl acetate, and vinyl alcohol-based copolymers obtained by performing saponification of a copolymer of vinyl acetate and another monomer copolymerizable therewith, and modified polyvinyl alcohol-based polymers obtained by partial modification of hydroxyl groups thereof.

To the adhesive bond, multivalent aldehydes, water-soluble epoxy compounds, melamine-based compounds, zirconia compounds, zinc compounds, glyoxylic acid salts and the like may be added as a crosslinking agent. When the water-based adhesive bond is used, the adhesive bond layer obtained therefrom has a thickness of usually 1 µm or less.

Examples of another preferred adhesive bond include curable adhesive bond compositions containing epoxy compounds cured by irradiation with actinic energy rays or heating. Here, the curable epoxy compounds have at least two epoxy groups in a molecule thereof. In this case, adhesion of the polarizer to the protective film may be performed by a method of curing curable epoxy compounds contained in the adhesive bond by irradiating actinic energy rays or imparting heat to an applied layer of the adhesive bond composition. The curing of the epoxy compound is generally performed by cationic polymerization of the epoxy compound. Further, from the viewpoint of productivity, it is preferred that the curing is performed by irradiation with actinic energy rays.

When a curable adhesive bond is used, the adhesive bond layer obtained therefrom has a thickness usually from 0.5 µm to 5 µm.

When the curable adhesive bond is used, the curable adhesive bond is cured by adhering a film by means of an adhering roll, and then drying the film if necessary, and irradiating with actinic energy rays or imparting heat. A light source of the actinic energy rays is not particularly limited, but actinic energy rays having a light emission distribution at a wavelength of 400 nm or less is preferred, and specifically, a low-pressure mercury lamp, a medium-pressure mercury lamp, a high-pressure mercury lamp, an ultra high-pressure mercury lamp, a chemical lamp, a black light lamp, a microwave-excited mercury lamp, a metal halide lamp and the like are preferably used.

From the viewpoint of weather resistance, refractive index, cationic polymerizability and the like, it is preferred that the epoxy compounds contained in the curable adhesive bond composition do not include an aromatic ring in a molecule thereof. Examples of the epoxy compounds which do not include an aromatic ring in a molecule thereof include hydrogenated epoxy compounds, alicyclic epoxy compounds, aliphatic epoxy compounds and the like. The epoxy compounds suitably used in the curable adhesive bond composition are described in detail, for example, in Japanese Patent Application Laid-Open No. 2004-245925.

In adhering the optical film of the present invention to the polarizer with an adhesive bond, the optical film of the present invention may be subjected to surface treatment (for example, glow discharge treatment, corona discharge treatment, and ultraviolet (UV) treatment) or formation of an easily adhesive layer on a surface facing the polarizer for the purpose of enhancing adhesion strength. It is possible to use materials, formation methods and the like of an easily adhesive layer described in Japanese Patent Application Laid-Open No. 2007-127893.

When a film other than the optical film of the present invention is used as a protective film, for example, in an aspect in which a cellulose acylate film (cellulose acylate-based polymer layer) is used, a device may be manufactured by adhering to a back surface of the cellulose acylate film to the polarizer. In an aspect in which a water-based adhesive bond is used in the adhesion of the cellulose acylate film to the polarizer, it is preferred that an adhesion surface of the cellulose acylate film is subjected to alkali saponification treatment. Further, in the adhesion, a complete saponification type polyvinyl alcohol aqueous solution may be used.

As the polarizer, a polarizer prepared by the method publicly known in the related art may be used, and a polyvinyl alcohol-based polarizer is preferred. For example, a polarizer obtained by treating a film, which is composed of a hydrophilic polymer such as an ethylene-modified polyvinyl alcohol having a polyvinyl alcohol or ethylene unit of 1% by mol to 4% by mol, a polymerization degree of 2,000 to 4,000 and a saponification degree of 99.0% by mol to 99.99% by mol with a dichroic dye such as iodine and stretching the film, or a polarizer obtained by treating a plastic film such as vinyl chloride and orienting the film is used.

Examples of a method of obtaining a polarizer film having a thickness of 10 µm or less, by stretching and dyeing a laminated film in which a polyvinyl alcohol layer is formed on a substrate, include methods described in Japanese Patent Nos. 5048120, 5143918, 5048120, 4691205, 4751481 and 4751486, and these techniques publicly known relating to the polarizer may also be preferably used in the polarizing plate of the present invention.

<Functional Layer>

The polarizing plate of the present invention may have a functional layer on at least one surface of the optical film of the present invention, which is a protective film. Examples of the functional layer include a pattern phase difference layer for displaying a 3-D image, a $\lambda/4$ layer, an optically anisotropic layer, a hardcoat layer, an antireflection layer, an antiglare layer, an antistatic layer, an easily adhesive layer and the like. Each functional layer may be used either alone or in combination. In addition, particularly in an aspect in which a pattern phase difference layer or a $\lambda/4$ layer is formed on the optical film of the present invention, preferred is an aspect in which a hardcoat layer is formed on another surface of the optical film of the present invention, or on the pattern phase difference layer or the $\lambda/4$ layer. Furthermore, in an aspect in which a hardcoat layer is formed on a pattern phase difference layer or a $\lambda/4$ layer, it is preferred that a layer disposed on the viewing side or the hardcoat layer has UV absorption ability rather than the hardcoat layer or the pattern phase difference layer, or the $\lambda/4$ layer.

In the case of a configuration in which the polarizing plate of the present invention has a protective film/a polarizer/a functional layer, that is, the polarizing plate of the present invention sandwiches the polarizer with the optical film of the present invention as the protective film and the functional layer, in a liquid crystal display device, in an aspect in which the functional layer is disposed on a side close to a liquid crystal cell, it is preferred that the functional layer is a $\lambda/4$ layer, an optically anisotropic layer, a hardcoat layer, an antistatic layer, and an easily adhesive layer.

<Pattern Phase Difference Layer>

In a pattern phase difference layer, at least one of an in-plane slow axis direction and an in-plane retardation includes a first phase difference region and a second phase difference region, which are different from each other, and the first and second phase difference regions are alternately disposed in the in-plane, and have a boundary portion therebetween. An example thereof is an optically anisotropic layer in which the first and second phase difference regions each have an Re of approximately $\lambda/4$, and in-plane slow axes are orthogonal to each other. Various methods may be used in the formation of the pattern phase difference layer, but it is preferred that the pattern phase difference layer is formed by polymerizing a rod-like liquid crystal having a polymerizable group in a horizontal alignment state and a discotic liquid crystal in a vertical alignment state, and fixing the liquid crystals.

In general, liquid crystal compounds may be classified into a rod-like type and a discotic type according to the shape thereof. Further, each includes low-molecular types and polymer types. The polymer generally refers to a type having a polymerization degree of 100 or more (Polymer Physics-Phase Transition Dynamics), by Masao Doi, p. 2, published by Iwanami Shoten, Publishers, 1992). In a pattern optical anisotropic layer used in the present invention, any type of liquid crystalline compounds may be used, but it is preferred that a rod-like liquid crystalline compound or a discotic liquid crystalline compound is used. It is also possible to use two or more kinds of rod-like liquid crystalline compounds, two or more kinds of discotic liquid crystalline compounds, or a mixture of a rod-like liquid crystalline compound and a discotic liquid crystalline compound. It is more preferred that the pattern optical anisotropic layer is formed using a rod-like liquid crystalline compound having a reactive group or a discotic liquid crystalline compound having a reactive group, because such a compound may reduce a temperature change or a humidity change, and it is still more preferred that the pattern optical anisotropic layer is formed using at least one compound having two or more reactive groups in a single liquid crystalline molecule. The liquid crystalline compound may be used in the form of a mixture of two or more kinds of compounds, and in this case, it is preferred that at least one of the compounds has two or more reactive groups.

As the rod-like crystalline compounds, for example, compounds described in Japanese Unexamined Patent Application Publication No. H11-513019 or Japanese Patent Application Laid-Open No. 2007-279688 may be preferably used, and as the discotic liquid crystalline compounds, for example, compounds described in Japanese Patent Application Laid-Open No. 2007-108732 or 2010-244038 may be preferably used, but examples are not limited thereto.

It is also preferred that the liquid crystalline compound has two or more kinds of reactive groups which have different polymerization conditions from each other. In this case, a phase difference layer including a polymer having an unreacted reactive group may be manufactured by polymerizing only a specific kind of reactive group among a plurality of reactive groups by selecting a condition. The polymerization condition to be used may be a wavelength region of ionized radiation used for the polymerization and fixation or difference between mechanisms of polymerization to be used, but preferably, the condition may be a combination of a radically reactive group and a cationically reactive group, which may be controlled according to the kind of initiator to be used. The combination of an acrylic group and/or a methacrylic group as the radically reactive group and a vinyl ether group, an oxetane group, and/or an epoxy group as the cationic group easily controls the reactivity, which is particularly preferred.

The optically anisotropic layer may be formed by various methods using an alignment film, but the preparation method thereof is not particularly limited.

A first aspect is a method of making a predetermined alignment controlling action predominant, the method predominant, by using multiple actions that affect the alignment control of liquid crystal, and then removing any of those actions through an external stimulation (heat treatment and the like). For example, the liquid crystal may be aligned in a predetermined alignment state by a combined action of the alignment controlling capability by the alignment film and the alignment controlling capability of an alignment controlling agent which is added to a liquid crystalline compound, and then the alignment state is fixed to form one phase difference region, and after that, by an external stimulation (heat treatment and the like), any of the actions (for example, the action by the alignment controlling agent) may be removed while another alignment controlling actions (the action by the alignment film) may become predominant, and accordingly, the another alignment state may be implemented, and fixed to form the other phase difference region. For example, a predetermined pyridinium compound or a predetermined imidazolium compound is localized on the surface of the hydrophilic polyvinyl alcohol alignment film because a pyridinium group or an imidazolium group is hydrophilic. In particular, when an amino group as a substituent for the acceptor of a hydrogen atom is substituted, the intermolecular hydrogen bonding also occurs between the pyridinium group and polyvinyl alcohol, and therefore, the pyridinium group may be localized on the surface of the alignment film at a higher density, and simultaneously, owing to the effect of the hydrogen bonding, a pyridinium derivative is aligned in a direction orthogonal to the main chain of polyvinyl alcohol, and as a result, the orthogonal alignment of liquid crystal is promoted with respect to the rubbing direction. The pyridinium derivative has a plurality of aromatic rings in a molecule thereof, and thus provides a strong intermolecular $\pi$-$\pi$ interaction with the aforementioned liquid crystal, especially with the discotic liquid crystalline compound, thereby inducing orthogonal alignment of a discotic liquid crystal in the vicinity of the alignment film interface. In particular, when a hydrophobic aromatic ring is linked to the hydrophilic pyridinium group, the compounds also have an effect of inducing vertical alignment owing to the hydrophilic effect of the ring therein. However, when the compound is heated at a temperature higher than a certain temperature, the hydrogen bonding may be broken and the density of the pyridinium compound on the surface of the alignment film may be lowered, and the aforementioned effect is lost. As a result, the liquid crystal is aligned by the controlling force of the rubbing alignment film itself and is in a parallel alignment state. The details of the method are described in Japanese Patent Application Laid-Open No. 2012-8170, and the content thereof is incorporated herein by reference.

A second aspect is an aspect using a patterned alignment film. In the aspect, a patterned alignment film having different alignment controlling capabilities is formed, and a liquid-crystal compound is disposed thereon so that the liquid crystal is aligned on the alignment film. The alignment of the liquid crystal is controlled by each alignment controlling capability of the patterned alignment film, thereby achieving different alignment states. By fixing each alignment state, patterns of first and second phase difference regions are formed according to the pattern of the alignment film. The patterned alignment film may be formed using a printing method, a mask rubbing for a rubbing alignment film, a mask exposure for a photo-alignment film or the like. Furthermore, the patterned alignment film may also be formed by uniformly forming an alignment film, and separately printing an additive (for example, the aforementioned onium salt and the like) which imparts influence to the alignment controlling capability in a predetermined pattern. A method of using the printing method is preferred in that a large-scale facility is not necessary, or the preparation is facilitated. The details of the method are described in Japanese Patent Application Laid-Open No. 2012-032661, and the content thereof is incorporated herein by reference.

The first and second aspects may be used in combination. One example is an example of adding a photo acid generating agent to the alignment film. In this example, a photo acid generating agent is added to the alignment film, and then pattern-exposed to form a region where the photo acid generating agent is decomposed to generate an acid compound and a region where an acid compound is not generated. At a portion on which light is not irradiated, the photo acid generating agent is kept almost undecomposed, and the interaction between the alignment film material, the liquid crystal, and the alignment controlling agent added thereto if desired governs the alignment state, and accordingly, the liquid crystal is aligned in a direction in which the slow axis thereof is orthogonal to the rubbing direction. When light is irradiated on the alignment film to generate an acidic compound, the aforementioned interaction is no more predominant, and the rubbing direction for the rubbing alignment film governs the alignment state, and accordingly, the liquid crystal is aligned in parallel so that the slow axis thereof is in parallel to the rubbing direction. As the photo acid generating agent to be used in the alignment film, a water-soluble compound is preferably used. Examples of the photo acid generating agent usable herein include the compounds described in Prog. Polym. Sci., 23, 1485 (1998). As the photo acid generating agent, pyridinium salts, iodonium salts and sulfonium salts are particularly preferably used. The details of the method are described in Japanese Patent Application Laid-Open No. 2012-150428, and the content thereof is incorporated herein by reference.

(Shapes of First Region and Second Region)

The optical film of the present invention has a first phase difference region (hereinafter, simply referred to as a first region) and a second phase difference region (hereinafter, simply referred to as a second region), of which birefringence is different from each other, and an optically anisotropic layer (hereinafter, also referred to as a pattern phase difference) in which the first phase difference region and the second phase difference region are alternately patterned for every one line. It is preferred that the first region and the second region have a band-like shape with the lengths of the short sides of the regions almost identical to each other, and are repetitively and alternately patterned from the viewpoint of being used for a 3D stereoscopic image display system.

In the optical film of the present invention, it is preferred that the slow axis of the first region and the slow axis of the second region are approximately orthogonal to each other from the viewpoint that the polarization state of light passing through the first region and the second region may be switched from the linearly polarized light to the circularly polarized light or from the circularly polarized light to the linearly polarized light when a 3D image is displayed. Further, in the optical film of the present invention, it is more preferred that the slow axis of the first region and the slow axis of the second region are orthogonal to each other from the viewpoint that the polarization state of light passing through the first region and the second region may be switched from the linearly polarized light to the circularly polarized light or from the circularly polarized light to the linearly polarized light, without being elliptically polarized when a 3D image is displayed.

In the optical film of the present invention, it is preferred that the direction of the long side of the pattern and the direction in which the sound velocity of the support becomes the maximum are approximately orthogonal to each other from the viewpoint that the misalignment of the pattern region and the pixel may be reduced and the crosstalk may be suppressed.

(Retardation)

As described above, it is preferred that a pattern phase difference layer having a function of converting the linearly polarized light into the circularly polarized light, or the circularly polarized light into the linearly polarized light has a ¼ retardation of the wavelength. In general, the ¼ retardation is called as a ¼ wavelength plate, and at a visible light wavelength of 550 nm, Re=137.5 nm becomes an ideal value.

A pattern phase difference layer of converting the linearly polarized light into the circularly polarized light or the circularly polarized light into the linearly polarized light does not always have a ¼ retardation. For example, the pattern phase difference layer may have a −¼ or ¾ retardation of the wavelength, and may have the retardation represented by a general formula, a ¼±n/2 (n is an integer) retardation of the wavelength.

For the patterning in which the slow axis of the first region and the slow axis of the second region are orthogonal to each other, regions having a −¼ or ¼ retardation of the wavelength may be alternately formed. At this time, the slow axes of the respective regions are almost orthogonal to each other. Furthermore, ¼ and ¾ retardations of the wavelength may be patterned, and at this time, the slow axes of the respective regions become almost parallel to each other. However, the rotation directions of the circularly polarized light of the respective regions are opposite to each other.

For the patterning of the ¼ and ¾ retardation of the wavelength, ½ or −½ retardation of the wavelength may be formed after the ¼ of the wavelength is formed on the entire surface.

When the optical film of the present invention is allowed to have the ¼ retardation of the wavelength, a Re (550) value of the first region included in the optical film and a Re (550) value of the second region included in the optical film are preferably 30 nm to 250 nm, more preferably 50 nm to 230 nm, particularly preferably 100 nm to 200 nm, more particularly preferably 105 nm to 180 nm, still more preferably 115 nm to 160 nm, and more particularly preferably 120 nm to 150 nm.

During the 3D image display, the entire Re (550) of the pattern phase difference layer and the support is preferably 110 nm to 165 nm, more preferably 110 nm to 155 nm, and still more preferably 120 nm to 145 nm from the viewpoint that the polarization state of light passing through the first region and the second region may be switched from the linearly polarized light to the circularly polarized light or from the circularly polarized light to the linearly polarized light. In particular, it is preferred that the entire Re (550) of the pattern phase difference layer and the support is within the range, and the slow axes of the first region and the second region are approximately orthogonal to each other from the viewpoint that the polarization state of an image for the right eye and an image for the left eye may be changed with good accuracy.

<λ/4 Layer>

A λ/4 layer is an aspect of only the first phase difference region described in the section of the aforementioned pattern phase difference layer. That is, the λ/4 layer is not an aspect of having two regions in which birefringence is different from each other, but an aspect of having regions in which birefringence is uniform. Preferred materials or retardation ranges are the same as those of the pattern phase difference layer.

<Optically Anisotropic Layer>

An optically anisotropic layer refers to a layer composed of the various polymers in a predetermined alignment state, or a layer formed by polymerizing a rod-like liquid crystal or a discotic liquid crystal having a polymerizable group in a predetermined alignment state, and fixing the liquid crystal. As the rod-like liquid crystal or the discotic liquid crystal having a polymerizable group, a material such as the pattern phase difference layer may be used.

<Hardcoat Layer>

The hardcoat layer used in the present invention is a layer for imparting hardness or scratch resistance to a film. The hardcoat layer may be formed, for example, by applying an application composition on the optical film of the present invention, which is a substrate film, and curing the composition. Further, for the purpose of adding other functions, other functional layers may be laminated on the hardcoat layer. In addition, by adding a filler or an additive to the hardcoat layer, mechanical, electrical and optical physical performances, or chemical performances such as water repellency.oil repellency may also be imparted to the hardcoat layer itself.

The thickness of the hardcoat layer is preferably 0.1 μm to 6 μm, and more preferably 3 μm to 6 μm. By having a thin hardcoat layer in the range, an optical film including a hardcoat layer, in which improvement of physical properties such as suppression of brittleness or curls, lightness and reduction in preparation costs have been achieved, is manufactured. Furthermore, when a substrate film has a large tensile elastic modulus in a TD direction, a pencil hardness may be significantly increased by setting the tensile elastic modulus to the specific elastic modulus range or more.

It is preferred that the hardcoat layer is formed by curing a curable composition. It is preferred that the curable composition is prepared as a liquid application composition. One example of the application composition includes a monomer or an oligomer for a matrix forming binder, polymers, and an organic solvent. A hardcoat layer may be formed by applying an application composition, and then curing the composition. In the curing, a crosslinking reaction or a polymerization reaction may be used.

(Monomer or Oligomer for Matrix Forming Binder)

Examples of an available monomer or oligomer for a matrix forming binder include ionized radiation curable polyfunctional monomers and polyfunctional oligomers. It is preferred that the polyfunctional monomers or polyfunctional oligomers are monomers capable of undergoing a crosslinking reaction or a polymerization reaction. The functional group of the ionized radiation curable polyfunctional monomer or the polyfunctional oligomer is preferably a photopolymerizable, electron beam polymerizable, or radiation polymerizable functional group, and among them, the photopolymerizable functional group is preferred.

Examples of the photopolymerizable functional group include unsaturated polymerizable functional groups such as a (meth)acryloyl group, a vinyl group, a styryl group, and an allyl group, or ring-opening polymerization type polymerizable functional groups such as epoxy-based compounds, and among them, a (meth)acryloyl group is preferred.

Specific examples of the photopolymerizable polyfunctional monomer having a photopolymerizable functional group include:

(meth)acrylic acid diesters of alkylene glycol, such as neopentyl glycol acrylate, 1,6-hexanediol (meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate;

(meth)acrylic acid diesters of ethylene oxide or propylene oxide adduct, such as 2,2-bis{4-(acryloxy.diethoxy)phenyl}propane and 2-2-bis{4-(acryloxy.polypropoxy)phenyl}propane; and the like.

Urethane(meth)acrylates, polyester(meth)acrylates, isocyanuric acrylates and epoxy(meth)acrylates may also be preferably used as a photopolymerizable polyfunctional monomer.

Among those described above, esters of a polyhydric alcohol and (meth)acrylic acid are preferred, and polyfunctional monomers having three or more (meth)acryloyl groups in one molecule thereof are more preferred.

Specific examples thereof include (di)pentaerythritol tri(meth)acrylate, (di)pentaerythritol tetra(meth)acrylate, (di)pentaerythritol penta(meth)acrylate, (di)pentaerythritol hexa(meth)acrylate, tripentaerythritol triacrylate, tripentaerythritol hexatriacrylate, trimethylolpropane tri(meth)acrylate, trimethylolethane tri(meth)acrylate, ditrimethylolpropane tetra(meth)acrylate, EO-modified trimethylolpropane tri(meth)acrylate, PO-modified trimethylolpropane tri(meth)acrylate, EO-modified phosphoric acid tri(meth)acrylate, 1,2,4-cyclohexane tetra(meth)acrylate, pentaglycerol triacrylate, 1,2,3-cyclohexane tetramethacrylate, polyester polyacrylate, caprolactone-modified tris(acryloxyethyl)isocyanurate and the like.

In the present specification, "(meth)acrylate", "(meth)acrylic acid" and "(meth)acryloyl" mean "acrylate or methacrylate", acrylic acid or methacrylic acid" and "acryloyl or methacryloyl", respectively.

For resins having three or more (meth)acryloyl groups, examples thereof also include polyester resins having a relatively low molecular weight, as well as polyether resins, acrylic resins, epoxy resins, urethane resins, alkyd resins, spiroacetal resins, polybutadiene resins, polythiol polyene resins, oligomers or prepolymers of polyfunctional compounds such as polyhydric alcohols, and the like.

For specific compounds of polyfunctional acrylate-based compounds having three or more (meth)acryloyl groups, reference may be made to [0096] of Japanese Patent Application Laid-Open No. 2007-256844 and the like.

Examples of urethane acrylates include urethane acrylate-based compounds obtained by reacting hydroxyl group-containing compounds such as alcohol, polyol and/or hydroxyl group-containing acrylate with isocyanates, or if necessary, esterifying the polyurethane compound obtained through the reaction with (meth)acrylic acid.

For specific examples of specific compounds, reference may be made to [0017] of Japanese Patent Application Laid-Open No. 2007-256844 and the like. Use of isocyanuric acrylates is preferred because the curling may be reduced. Examples of isocyanuric acrylates include isocyanuric diacrylates and isocyanuric triacrylates; and for specific examples of those compounds, reference may be made to [0018] to [0021] of Japanese Patent Application Laid-Open No. 2007-256844 and the like.

An epoxy-based compound may be used in the hardcoat layer for reducing the shrinkage of the layer through curing. As the epoxy group-containing monomers to constitute the compound, usable are monomers having two or more epoxy groups in one molecule thereof, and examples of those monomers include epoxy-based monomers described in Japanese Patent Application Laid-Open Nos. 2004-264563, 2004-264564, 2005-37737, 2005-37738, 2005-140862, 2005-140862, 2005-140863, 2002-322430 and the like. In addition, it is also preferred that compounds having both epoxy and acrylic functional groups such as glycidyl(meth)acrylate are used.

(Polymer Compound)

The hardcoat layer may contain a polymer compound. Description and preferred specific examples of the polymer compound are also the same as the contents described in Japanese Patent Application Laid-Open No. 2012-215812, and the content described in the patent document is incorporated herein.

(Curable Composition)

Description and preferred specific examples of the curable composition which may be used in the formation of the hardcoat layer are also the same as the contents described in Japanese Patent Application Laid-Open No. 2012-215812, and the content described in the patent document is incorporated herein.

(Properties of Hardcoat Layer)

It is preferred that the hardcoat layer has excellent scratch resistance. Specifically, when a pencil hardness test as an index of scratch resistance is performed, it is preferred that 3H or higher is achieved.

The polarizing plate of the present invention may have other layers along with the optical film of the present invention and the hardcoat layer in order to exhibit a function suitable for each use. For example, the polarizing plate of the present invention may have an antireflection layer, an antistatic layer, an antifouling layer and the like in addition to an antiglare layer and a clear hardcoat layer.

Since fingerprint resistance and antifouling property are required particularly for image display screens having various types of touch panels recently supplied, it is also useful to form a fingerprint resistant layer or an antifouling property layer on the optical film of the present invention. For the fingerprint resistant layer and the antifouling property layer, reference may be made to, for example, Japanese Patent Nos. 4517590 and 4638954 and International Publication Nos. WO2010/090116 and WO2011/105594.

There is no limitation even on the image display device, and the image display device may be a liquid crystal display device including a liquid crystal cell, an organic EL image display device including an organic EL layer, or a plasma display device. A cellulose acylate-based polymer layer, a polyester-based polymer layer, an acrylic polymer layer, a cycloolefin-based polymer layer, and a layer composed of a composition including a liquid crystal compound have good adhesibility with a polarizer, and thus are suitable for use in a liquid crystal display device including a polarizing plate as an essential member.

In the manufacture of the polarizing plate, when the optical film of the present invention has an in-plane slow axis, it is preferred that the in-plane slow axis is adhered to the transmission axis of the polarizer so as to be parallel or orthogonal to each other.

[Liquid Crystal Display Device]

The liquid crystal display device of the present invention has at least one polarizing plate of the present invention.

In the polarizing plate, an example of methods of disposing the optical film of the present invention is a surface protective film of the polarizing plate, in which the optical film of the present invention is disposed on the outer side of the polarizer (that is, disposed so as to be further distant from the liquid crystal cell than the polarizer of the polarizing plate), in a state where the optical film of the present invention does not have a functional layer such as a hardcoat layer. Another example of methods of disposing the optical film of the present invention is a surface protective film of the polarizing plate in the polarizing plate on the display surface side, in which the optical film of the present invention is disposed on the outer side of the polarizer (that is, disposed so as to be further distant from the liquid crystal cell than the polarizer of the polarizing plate), in a state where the optical film of the present invention has a functional layer such as a hardcoat layer. Furthermore, in the liquid crystal display device of the present invention, it is also preferred that the polarizing plate is disposed such that the optical film of the present invention becomes closer to the liquid crystal cell than the protective film on another side.

With respect to the other configurations, any configuration of a publicly known liquid crystal display device may be adopted. There is no particular limitation even on the mode thereof, and it is possible to configure the liquid crystal display device of the present invention as a liquid crystal display device of various display modes such as TN (twisted nematic), IPS (in-plane switching), FLC (ferroelectric liquid crystal), AFLC (anti-ferroelectric liquid crystal), OCB (optically compensatory bend), STN (supper twisted nematic), VA (vertically aligned) and HAN (hybrid aligned nematic).

The liquid crystal display device of the present invention is preferably a transmissive liquid crystal display device, the transmissive liquid crystal display device is usually includes a backlight and two polarizing plates in which the liquid crystal cell and the transmission axis are orthogonal to each other, and the two polarizing plates are adhered to the viewing side of the liquid crystal cell and the backlight side through an adhesive layer.

The aforementioned liquid crystal cell has a liquid crystal layer and two glass substrates provided on both sides of the liquid crystal layer.

As a glass substrate for a liquid crystal display device, silicate glass is used, preferably, silica glass and borosilicate glass are used, and most preferably, alkali-free borosilicate glass is used. When alkali components are contained in a glass substrate for a liquid crystal display device, alkali components are eluted, and thus there is concern in that a TFT may be damaged. Meanwhile, the alkali-free borosilicate glass herein refers to glass in which alkali components are not substantially included, and specifically to glass including alkali components in an amount of 1,000 ppm or less. As for the content of alkali components in the present invention, alkali components are present in an amount of preferably 500 ppm or less, and more preferably 300 ppm or less.

The glass substrate for a liquid crystal display device is an approximately rectangular plate-like body when viewed from the flat surface, and preferably has a glass substrate having a plate thickness of 0.01 mm to 1.1 mm. When the plate thickness is 0.01 mm or more, it is difficult for the glass substrate to be affected by interference of light or internal distortion and the like caused by deformation of a glass substrate for display to be evaluated, and when the plate thickness is 1.1 mm or less, it is difficult for brightness to be reduced during the evaluation. A more preferred plate thickness is 0.1 mm to 0.7 mm, and a still more preferred plate thickness is 0.1 mm to 0.5 mm.

The method of adhering the polarizing plate of the present invention to the liquid crystal display device is not particularly limited, and a polarizing plate having a size of a display surface of the liquid crystal display device may be prepared, and then may be each adhered to both surfaces of the liquid crystal cell.

As the method of adhering the polarizing plate of the present invention to the liquid crystal display device, a roll-to-panel manufacturing method may also be used, and is preferred in terms of enhancing productivity and yield. The roll-to-panel manufacturing method is described in Japanese Patent Application Laid-Open Nos. 2011-48381 and 2009-175653, Japanese Patent Nos. 4628488 and 4729647, International Publication Nos. 2012/014602 and 2012/014571, and the like, but is not limited thereto.

The method of adhering the polarizing plate to the liquid crystal display device may also be an adhesion method including a first cutting adhesion process of using a roll in which a band-like sheet-type product of a first polarizing plate having a width corresponding to a short side of a display surface of a liquid crystal display device is wound to cut the first polarizing plate into a length corresponding to a long side of the display surface of the liquid crystal display device, and then adhering the first polarizing plate to a display surface on one side of the liquid crystal cell of the liquid crystal display device, and a second cutting adhesion process of using a roll in which a band-like sheet-type product of a second polarizing plate having a width corresponding to the long side of the display surface of the liquid crystal display device is wound, to cut the second polarizing plate into a length corresponding to the short side of the display surface of the liquid crystal display device, and then adhering the second polarizing plate to a surface on the other side of the liquid crystal cell of the liquid crystal display device.

According to the method, it is possible to obtain the polarizing plates corresponding to the short side and the long side, respectively, of the display surface of the liquid crystal display device by using a roll of a polarizing plate having a width corresponding to the short side and a roll of a polarizing plate having a width corresponding to the long side, of the display surface of the liquid crystal display device to only cut the polarizing plate supplied from each roll at a predetermined interval. For this reason, by cutting the first polarizing plate into a length corresponding to the long side and cutting the second polarizing plate into a length corresponding to the short side to adhere the polarizing plates to both surfaces of the liquid crystal cell of the liquid crystal display device, two rolls having the same direction in optical anisotropy, such as adsorption axis may be used to adhere the upper and lower polarizing plates to the liquid crystal cell such that optical anisotropies of the adsorption axis and the like are orthogonal to each other.

In the adhesion by the method, it is preferred to use an adhesion system including: a supplying apparatus of a liquid crystal cell for supplying the liquid crystal cell, a supplying apparatus of a first polarizing plate for withdrawing a band-like sheet-type product from a roll in which the band-like sheet-type product of the first polarizing plate is wound, cutting the product into a predetermined length, and then supplying the product, a first adhesion apparatus for adhering the first polarizing plate, which is supplied from the supplying apparatus of the first polarizing plate, onto one surface of the liquid crystal cell, which is supplied from the supplying apparatus of the liquid crystal cell, a conveying and supplying apparatus for conveying and supplying the liquid crystal cell after adhering the first polarizing plate, a supplying apparatus of a second polarizing plate for withdrawing the band-like sheet-type product from a roll in which the belt-like sheet-type product of the second polarizing plate is wound, cutting the product into a predetermined length, and then supplying the product, and a second adhesion apparatus for adhering the second polarizing plate, which is supplied from the supplying apparatus of the second polarizing plate, onto the other surface of the liquid crystal cell, which is supplied from the conveying and supplying apparatus, in which so as for the supplying apparatus of the first polarizing plate and the supplying apparatus of the second polarizing plate to correspond to the long side and the short side of the liquid crystal cell, the one supplying apparatus cuts the polarizing plate having a width corresponding to the short side into a length corresponding to the long side, and the other supplying apparatus cuts the polarizing plate having a width corresponding to the long side into a length corresponding to the short side.

EXAMPLES

[Manufacture of Film 1]

A pellet of [a mixture of 90 parts by mass of an acrylic resin having a lactone ring structure represented by the following Formula (1) {copolymerization monomer mass ratio=methyl methacrylate/2-(hydroxymethyl)methyl acrylate=8/2, lactone cyclization ratio: about 100%, content ratio of the lactone ring structure: 19.4% by mass, weight average molecular weight: 133,000, melt flow rate: 6.5 g/10 min (240° C., 10 kgf), Tg: 131° C.} and 10 parts by mass of acrylonitrile-styrene (AS) resin {Toyo AS AS20, manufactured by Toyo-Styrene Co., Ltd.}; Tg 127° C.] was supplied to a twin-screw extruder and melt-extruded in a sheet form at about 280° C., conveyed with a high tension and wound in a roll form to obtain a long-sized Film 1 having a thickness of 40 μm.

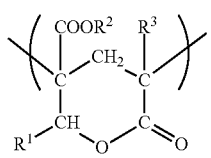

(1)

In Formula (1), $R^1$ is a hydrogen atom, and $R^2$ and $R^3$ are a methyl group.

[Manufacture of Films 2 to 4 and 19]

Film 2 was manufactured by stretching an unstretched sheet having a thickness of 115 μm in the MD direction by 3.0 times under the temperature condition of 160° C., which was manufactured in the same manner as Film 1, except that the thickness of the melt-extrusion was changed. Further, long-sized Films 3, 4 and 19 described in Table 1 were manufactured by stretching original films manufactured under conditions as in Film 1 under high temperature, except that the thickness of a long-sized unstretched sheet which was melt-extruded was changed. Meanwhile, a tensile elastic modulus in an MD direction may be increased by increasing the stretching ratio in the MD direction.

[Manufacture of Film 5]

An imidized resin was obtained by a method described in [0173] to [0176] of Japanese Patent Application Laid-Open No. 2011-138119. The imidized resin is an acrylic resin, which has a glutarimide ring structure and does not have an aromatic vinyl structure, in a main chain thereof.

100 parts by mass of the imidized resin obtained and 0.10 parts by mass of the following triazine compound A were prepared into a pellet using a single-screw extruder.

A pellet of the imidized resin manufactured above was supplied to a twin-screw extruder, melt-extruded in a sheet form, conveyed with a high tension, and then wound to obtain long-sized Film 5 having a thickness of 40 μm.

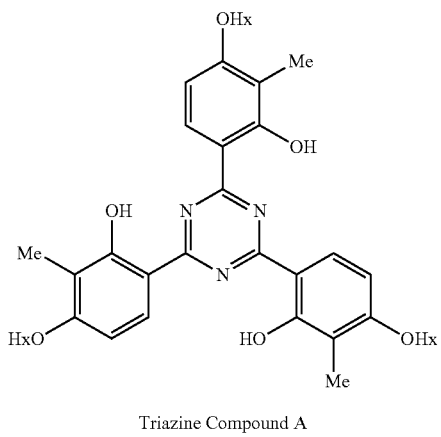

Triazine Compound A

Me and Hx represent a methyl group and a hexyl group, respectively.

[Manufacture of Film 6]

Long-sized Film 6 described in Table 1 was manufactured by stretching an original film manufactured under the same condition as in Film 5 under high temperature, except that the thickness of a long-sized unstretched sheet which was melt-extruded was changed.

[Manufacture of Film 7]

A PMMA (polymethyl methacrylate) resin (DELPET 80N manufactured by Asahi Kasei Chemicals Corporation) was dried by a vacuum dryer at 90° C. to set the water content ratio to 0.03% or less, and 1.0 part by mass of an ultraviolet absorbent (ADK STAB LA-31 manufactured by ADEKA Corporation) and 0.3 parts by mass of a stabilizer (IRGANOX 1010 (manufactured by BASF Corporation)) were mixed with 100 parts by mass of the PMMA (polymethyl methacrylate) resin at 230° C. by means of a twin-screw kneader to manufacture a PMMA resin pellet.

The PMMA Resin Pellet 7 manufactured above was melt-extruded from a coat hanger type T-die using a twin-screw extruder, conveyed with a high tension, and then wound to obtain a long-sized Film 7 having a thickness of 30 μm.

[Manufacture of Films 8 to 11]

Long-sized Films 8 to 11 described in Table 1 were manufactured by stretching original films manufactured under the same condition as in Film 7 under high temperature, except that the thickness of a long-sized unstretched sheet which was melt-extruded was changed.

[Manufacture of Film 12]

A commercially available cellulose acetate film (Fujitack TD60, manufactured by Fujifilm Corporation) was prepared and used as Film 12.

[Manufacture of Film 13]

A commercially available norbornene-based polymer film "ZEONOR ZF14-060" (manufactured by Optes Inc.) was prepared and used as Film 13.

[Manufacture of Film 14]

(Synthesis of Raw Material Polyester)

(Raw Material Polyester 1)

As described below, a polyester resin (Sb catalyst-based PET) was obtained using a continuous polymerization apparatus using a direct esterification method in which terephthalic acid and ethylene glycol were directly reacted with each other, water was removed by filtration, and after esterification, polycondensation was carried out under reduced pressure.

(1) Esterification Reaction

High purity terephthalic acid in an amount of 4.7 tons and ethylene glycol in an amount of 1.8 tons were mixed in a first esterification reaction tank over 90 minutes to form slurry, and the slurry was continuously supplied at a flow rate of 3,800 kg/hour to the first esterification reaction tank. Further, an ethylene glycol solution of antimony trioixde was supplied continuously, and reaction was carried out at a temperature of 250° C. inside the reaction tank and an average retention time of about 4.3 hours with stirring. At this time, antimony trioxide was continuously added thereto such that the addition amount of Sb was 150 ppm in terms of the element converted value.

The resulting reaction product was transferred to a second esterification reaction tank, and reacted with stirring at a temperature of 250° C. inside the reaction tank and an average retention time of 1.2 hours. To the second esterification reaction tank, an ethylene glycol solution of magnesium acetate and an ethylene glycol solution of trimethyl phosphate were continuously supplied such that the addition amounts of Mg and P were 65 ppm and 35 ppm, respectively in terms of the element converted values.

(2) Polycondensation Reaction

The esterification reaction product obtained above was supplied continuously to a first polycondensation reaction tank, and polycondensation was carried out with stirring at a reaction temperature of 270° C., a pressure of 20 Torr ($2.67 \times 10^{-3}$ MPa) inside the reaction tank, and an average retention time of about 1.8 hours.

The reaction product was transferred to a second polycondensation reaction tank, and in this reaction tank, reaction (polycondensation) was carried out with stirring at a temperature of 276° C. inside the reaction tank, a pressure of 5 Torr ($6.67 \times 10^{-4}$ MPa) inside the reaction tank, and a retention time of about 1.2 hours.

Subsequently, the reaction product was also transferred to a third polycondensation reaction tank, and in this reaction tank, reaction (polycondensation) was carried out at a temperature of 278° C. inside the reaction tank, a pressure of 1.5 Torr ($2.0 \times 10^{-4}$ MPa) inside the reaction tank and a retention time of 1.5 hours, so that a reaction product (polyethylene terephthalate (PET)) was obtained.

Subsequently, the obtained reaction product was discharged into cold water in a strand form and immediately cut, so that polyester pellets <cross section: about 4 mm of long diameter and about 2 mm of short diameter, length: about 3 mm> were manufactured.

For the polymer obtained, IV=0.63 (hereinafter, referred to as PET1).

(Raw Material Polyester 2)

10 parts by mass of a dried UV absorbent (2,2'-(1,4-phenylene)bis(4H-3,1-benzoxadinon-4-one) and 90 parts by mass of PET1 (IV=0.63) were mixed and a kneading extruder was used to obtain Raw Material Polyester 2 (hereinafter, referred to as PET2) containing an UV absorbent.

(Film Forming Process)

90 parts by mass of Raw Material Polyester 1 (PET1) and 10 parts by mass of Raw Material Polyester 2 (PET2) containing an UV absorbent were dried to have a water content ratio of 20 ppm or less, fed into Hopper 1 of a single-screw kneading extruder 1 with a diameter of 50 mm, and melted at 300° C. by Extruder 1. PET1 and PET2 were extruded from a die through a gear pump and a filter (a pore diameter of 20 µm) according to the following extrusion conditions.

The melt resin was extruded from the die under the melt resin extrusion conditions of a pressure change of 1% and a temperature distribution of 2% in the melt resin. Specifically, for the back pressure, pressure was applied by pressure 1% higher than an average pressure inside the barrel of the extruder, and for the piping temperature of the extruder, heating was performed at a temperature by 2% higher than an average temperature inside the barrel of the extruder.

The melt resin extruded from the die was extruded onto a cooling cast drum set to a temperature of 25° C., and was closely adhered to the cooling cast drum by using a static electricity applying method. An unstretched polyester film was obtained by peeling off the melt resin by means of a peeling roll disposed opposite to the cooling cast drum.

(Transverse Stretching Process)

The unstretched polyester film was led to a tenter (transverse stretcher), and was transversely stretched while being grasped with clips at ends of the film by the following method under the following conditions.

(Preheating Part)

By setting the preheating temperature to 95° C., heating was carried out up to a stretchable temperature.

(Stretching Part)

The preheated and unstretched polyester film was transversely stretched in the width direction under the following conditions.

<Conditions>

Transverse stretching temperature: 95° C.

Transverse stretching magnification: 4.7 times (Heat Fixation Part)

Subsequently, heat fixation treatment was performed while the film surface temperature of the polyester film was controlled to the following range.

<Conditions>

Heat relaxation temperature: 180° C.

Heat fixation time: 15 seconds (Heat Relaxation Part)

The polyester film after heat fixation was relaxed by heating the film to the following temperature.

Heat relaxation temperature: 170° C.

Heat relaxation ratio: TD direction (film width direction) 2%

(Cooling Part)

Subsequently, the polyester film after heat relaxation was cooled at a cooling temperature of 50° C.

(Collection of Film)

After cooling, both ends of the polyester film were trimmed by 20 cm. Thereafter, both ends of the polyester film were subjected to an extrusion processing (knurling) at a width of 10 mm, followed by winding at a tension of 18 kg/m. In this manner, a polyester-based polymer Film 14 having a thickness of 60 µm was obtained.

[Manufacture of Film 15]

A commercially available cellulose acylate film ZRD40 (manufactured by Fujifilm Corporation) was prepared and used as Film 15. The film thickness of Film 15 was 41

[Manufacture of Film 16]

(Preparation of Cellulose Acylate)

A cellulose acylate was synthesized by a method described in Japanese Patent Application Laid-Open Nos. H10-45804 and H08-231761, and the substitution degree thereof was measured. Specifically, sulfuric acid (7.8 parts by mass based on 100 parts by mass of cellulose) as a catalyst was added and carboxylic acid that was a raw material of an acyl substituent was added to perform an acylation reaction at 40° C. In this case, the kind and substitution degree of an acyl group was adjusted by adjusting the kind and amount of carboxylic acid. In addition, the reaction product was aged at 40° C. after the acylation. Furthermore, low-molecular weight components of the cellulose acylate were washed with acetone and removed.

(Preparation of Cellulose Acylate Solution for Low Substitution Degree Layer)

The following composition was put into a mixing tank and stirred to dissolve each component, thereby preparing a cellulose acylate solution.

| | |
|---|---|
| Cellulose acetate (Substitution degree 2.45) | 100.0 parts by mass |
| The following Optical Property Developing Agent B | 1.3 parts by mass |
| The following additive (polycondensation ester of carboxylic acid and diol) | 18.5 parts by mass |
| Methylene chloride | 365.5 parts by mass |
| Methanol | 54.6 parts by mass |

(Preparation of Cellulose Acylate Solution for High Substitution Degree Layer)

The following composition was put into a mixing tank and stirred to dissolve each component, thereby preparing a cellulose acylate solution.

| | |
|---|---|
| Cellulose acetate (Substitution degree 2.79) | 100.0 parts by mass |
| The following additive (polycondensation ester of carboxylic acid and diol) | 11.3 parts by mass |
| Silica particle R972 (manufactured by NIPPON AEROSIL CO., LTD.) | 0.15 parts by mass |
| Methylene chloride | 395.0 parts by mass |
| Methanol | 59.0 parts by mass |

Optical Property Developing Agent B

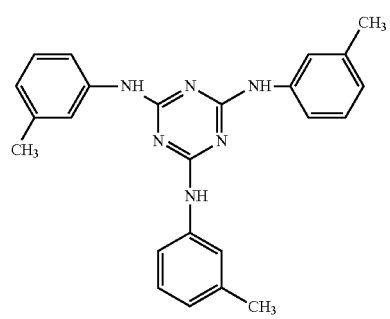 [SMILES: Cc1cccc(Nc2nc(Nc3cccc(C)c3)nc(Nc3cccc(C)c3)n2)c1]

Polycondensation ester:polycondensation of terephthalic acid as a dicarboxylic acid, succinic acid, ethylene glycol as a diol, and 1,2-propylene glycol (terephthalic acid:phthalic acid:ethylene glycol:1,2-propylene glycol=55:45:50:50 (molar ratio)) (terminal:an acetyl group, molecular weight 800)

(Preparation of Cellulose Acylate Film)

The cellulose acylate solution for a low substitution degree layer was cast to form a core layer having a film thickness of 36 μm, and the cellulose acylate solution for a high substitution degree layer was cast onto both surfaces of the core layer to form a skin layer having a film thickness of 2 μm. The web (film) obtained was peeled off from a band, inserted into a clip, and transversely stretched by 14% using a tenter at 130° C. in a state where the residual solvent was present in an amount from 20% to 5% based on the total mass of the film. Thereafter, the film was released from the clip and dried at 130° C. for 20 minutes, and then was again transversely stretched by 27% using a tenter at 180° C.

Meanwhile, the residual solvent amount was obtained according to the following equation.

Residual solvent amount(% by mass)=$(M-N)/N\times 100$

Here, M is a mass at any time point of the web, and N is a mass when a web with M measured is dried at 110° C. for 2 hours.

Thermoplastic Resin Film 16 was obtained therefrom (Film thickness 40 μm, Re=50 nm, and Rth=120 nm).

[Manufacture of Film 17]

<Preparation of Cellulose Acylate Solution>

Cellulose acylate and the composition described below were introduced into a mixing tank and stirred to dissolve each component, thereby preparing Cellulose Acylate Solution 17.

Composition of Cellulose Acylate Solution 17

| | |
|---|---|
| Cellulose acylate with an acetyl substitution degree of 1.6 and a propionyl substitution degree of 0.9 | 100.0 parts by mass |
| Sucrose benzoate with a benzoate substitution degree of 6.0 | 8.0 parts by mass |
| The following additive (polycondensation ester of carboxylic acid and diol) | 2.0 parts by mass |
| Methylene chloride (first solvent) | 400 parts by mass |
| Ethanol (second solvent) | 40.0 parts by mass |

Polycondensation ester:polycondensation ester of terephthalic acid as a dicarboxylic acid, adipic acid, ethylene glycol as a diol, and 1,2-propylene glycol (terephthalic acid:adipic acid:ethylene glycol:1,2-propylene glycol=55:45:50:50 (molar ratio)) (terminal:an acetyl group, molecular weight 1200)

(Preparation of Matting Agent Solution)

The following Compositions were introduced into a disperser and stirred to dissolve each component, thereby preparing a matting agent solution.

Composition of Matting Agent Solution

| | |
|---|---|
| Silica particle having an average particle size of 16 nm (AEROSIL R972, manufactured by Nippon Aerosil Co., Ltd.) | 1.6 parts by mass |
| Methylene chloride (first solvent) | 78.9 parts by mass |
| Ethanol (second solvent) | 8.8 parts by mass |
| Cellulose acylate solution 17 | 0.3 parts by mass |

After 1.0 part by mass of the matting agent solution was filtered, 92.7 parts by mass of Cellulose Acylate Solution 17 was added thereto, the resulting mixture was mixed using an in-line mixer and cast using a band casting machine, and immediately thereafter, was dried to a residual solvent content of 40% at a drying wind temperature of 30° C. and a drying wind speed of 1.4 m/s to peel off the film. As the drying wind, a fresh wind having an organic solvent concentration of 1% or less was used. The film having a residual solvent content of 15% at an ambient temperature of 130° C. was transversely stretched at a stretch magnification of 1.36 times and a stretch rate of 150%/minutes using a tenter, and then maintained at 130° C. for 30 seconds. Thereafter, the film was released from the clip and dried at 120° C. for 40 minutes to obtain Thermoplastic Resin Film 17 having a width of 2,000 mm (film thickness 40 μm, Re=50 nm, Rth=120 nm).

[Manufacture of Film 18]

"ZEONOR 1420R" manufactured by Zeon Corporation and having a thickness of 100 lam was longitudinally stretched with a stretch magnification of 33% at an air supply temperature of 140° C. and a film surface temperature of 130° C. in a longitudinal single-screw stretcher. Thereafter, the film was transversely stretched with a stretch magnification of 45% at an air supply temperature of 140° C. and a film surface temperature of 130° C. in a tenter stretcher, both ends of the film were wound with a cutting width of 1,500 mm as a roll film having a length of 4,000 m before the winding part to obtain biaxially stretched Thermoplastic Resin Film 18 (film thickness 40 µm, Re=50 nm, Rth=120 nm).

C. and a relative humidity of 80% for 48 hours and intervals (the measured value refers to L10) between pin holes measured after the sample was left to stand in an environment of 25° C. and a relative humidity of 10% for 48 hours were measured with a pin gauge. The humidity dimensional change rate of each film was calculated by the following Equation using these measurement values.

Humidity Dimensional Change Rate [%] of Film=
($L$80[cm]–$L$10[cm])/10[cm]×100

TABLE 1

|  |  | Film Thickness [µm] | Elastic Modulus [GPa] | | MD/TD ratio | Humidity Dimensional Change Rate | | Optical Characteristics [nm] | | Direction of In-plane Slow axis |
| --- | --- | --- | --- | --- | --- | --- | --- | --- | --- | --- |
|  |  |  | MD | TD |  | MD | TD | Re [590] | Rth [590] |  |
| C. Ex. 1 | Film 1 | 40 | 3.3 | 3.1 | 1.08 | 0.24 | 0.26 | 1 | −3 | TD |
| Ex. 1 | Film 2 | 40 | 3.8 | 2.8 | 1.37 | 0.19 | 0.32 | 1 | −5 | TD |
| Ex. 2 | Film 3 | 40 | 3.9 | 2.7 | 1.42 | 0.18 | 0.33 | 1 | −6 | TD |
| Ex. 3 | Film 4 | 40 | 4.1 | 2.7 | 1.51 | 0.15 | 0.36 | 1 | −6 | TD |
| C. Ex. 2 | Film 19 | 40 | 3.5 | 2.9 | 1.21 | 0.23 | 0.28 | 1 | −4 | TD |
| C. Ex. 3 | Film 5 | 40 | 3.3 | 3.1 | 1.08 | 0.24 | 0.26 | 1 | −3 | TD |
| Ex. 4 | Film 6 | 40 | 3.8 | 2.7 | 1.37 | 0.20 | 0.31 | 2 | −5 | TD |
| C. Ex. 4 | Film 7 | 30 | 3.2 | 2.9 | 1.08 | 0.21 | 0.26 | 1 | −4 | TD |
| Ex. 5 | Film 8 | 30 | 3.8 | 2.7 | 1.37 | 0.17 | 0.29 | 30 | −30 | TD |
| Ex. 6 | Film 9 | 25 | 3.7 | 2.7 | 1.37 | 0.18 | 0.29 | 25 | −25 | TD |
| Ex. 7 | Film 10 | 20 | 3.7 | 2.7 | 1.37 | 0.17 | 0.28 | 20 | −21 | TD |
| Ex. 8 | Film 11 | 10 | 3.7 | 2.7 | 1.37 | 0.18 | 0.29 | 10 | −9 | TD |
|  | Film 12 | 60 | — | — | — | — | — | 2 | 42 | MD |
|  | Film 13 | 60 | — | — | — | — | — | 2 | 1 | MD |
|  | Film 14 | 60 | — | — | — | — | — | 6500 | 6500 | MD |
|  | Film 15 | 41 | — | — | — | — | — | 2 | −5 | TD |
|  | Film 16 | 40 | — | — | — | — | — | 50 | 120 | TD |
|  | Film 17 | 40 | — | — | — | — | — | 50 | 120 | TD |
|  | Film 18 | 40 | — | — | — | — | — | 50 | 120 | TD |

Here, film thickness [µm], [GPa], Humidity Dimensional Change Rate [%] and optical characteristics [nm] were measured as follows.

[Measurement of Film Thickness]

A 5 cm by 5 cm sample was prepared and left to stand in an environment of 25° C. and a relative humidity of 60% for 48 hours, and then an average value obtained by measuring 6 points of in-plane film thickness was used as a film thickness.

[Measurement of Tensile Elastic Modulus]

For the tensile elastic modulus (GPa), a sample with a length of 200 mm and a width of 10 mm in a measurement direction was prepared and left to stand in an environment of 25° C. and a relative humidity of 60% for 48 hours, and then was provided using STROGRAPH V10-C manufactured by TOYO SEIKI Co., Ltd. such that the chuck distance in the longitudinal direction was 100 mm, a load was applied thereto at a stretch rate of 10 mm/minute such that the chuck distance was widened at a stretch rate of 10 mm/minute, and force at that time was measured. A tensile elastic modulus was calculated from the thickness of the film previously measured with a micrometer, the force and the elongation amount.

[Measurement of Humidity Dimensional Change Rate]

A sample with a length of 12 cm (measurement direction) and a width of 3 cm was prepared, pin holes were perforated in the sample at an interval of 10 cm in an environment of 25° C. and a relative humidity of 60%, and intervals (the measured value refers to L80) between pin holes measured after the sample was left to stand in an environment of 25°

[Measurement of Optical Characteristics]

After each film was humidity-controlled at 25° C. and a relative humidity of 60% for 24 hours, phase difference values at a wavelength of 590 nm were measured at 25° C. and a relative humidity of 60% in a direction perpendicular to the film surface and in a direction inclined by a 10° pitch from +50° to −50° from the normal line of the film surface by using the slow axis as the rotation axis by means of an automatic birefringence analyzer (KOBRA 21ADH: manufactured by Oji Scientific Instruments Inc.), and then an in-plane retardation value (Re) and a retardation value (Rth) in a thickness-direction were calculated. The direction of the in-plane slow axis corresponds to a direction in which the in-plane refractive index reaches a maximum value, and "MD" in Table 1 indicates that an in-plane slow axis is present in the MD direction of the film±5° range direction. "TD" in Table 1 indicates that an in-plane slow axis is present in the TD direction of the film±5° range direction.

<Manufacture of Films 1 to 14 and 19 Having Hardcoat Layer>

(Preparation of Application Composition HCL-1 for Forming Hardcoat Layer) 8 parts by mass of pentaerythritol triacrylate, 0.5 parts by mass of IRGACURE 127 (manufactured by BASF Corp.) and 4 parts by mass of a bifunctional acrylic compound represented by the following Formula C-3 were mixed to prepare an application product (HCL-1) for forming a hardcoat layer.

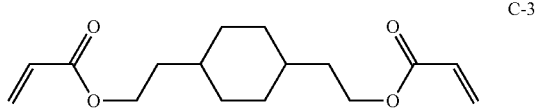 [SMILES: C=CC(=O)OCCC1CCC(CCOC(=O)C=C)CC1]

C-3

[Manufacture of Hardcoat Layer]

An application solution (HCL-1) for forming a hardcoat layer was applied on Optical Films 1 to 14 and 19 manufactured above by a die coat method, dried at 80° C. for 5 minutes, and then UV rays were irradiated at an irradiation dose of 300 mJ/cm$^2$ using an "air-cooled metal halide lamp" {manufactured by Eye Graphics Co., Ltd.} of 240 W/cm under nitrogen purge to cure the application layer, thereby forming a hardcoat layer having a dried film thickness of 5 μm.

In this manner, hardcoat layer-containing Optical Films 1 to 14 and 19 were manufactured, which had a hardcoat layer on Optical Films 1 to 14 and 19.

<Manufacture of Polarizing Plate>

[Manufacture of Polarizing Plate]

Iodine was adsorbed on a stretched polyvinyl alcohol film to manufacture a polarizer having a film thickness of 20 μm. Meanwhile, as a method of manufacturing a polarizer, for example, a method described in Example 1 of Japanese Patent Application Laid-Open No. 2001-141926 may be used, and as in Polarization Film (1) described in Japanese Patent Application Laid-Open No. 2013-008019, a polarizer may be manufactured by stretching PVA layer which is film-formed on an amorphous PET substrate.

(Manufacture of Polarizing Plate Used in Liquid Crystal Display Device 2)

(Manufacture of Polarizing Plate Using Adhesion Method A)

[Adhesive Bond for Polarizing Plate]

An adhesive bond for a polarizing plate was prepared by blending 100 parts by mass of 2-hydroxyethyl acrylate, 10 parts by mass of tolylene diisocyanate and 3 parts by mass of a photopolymerization initiator (IRGACURE 907, manufactured by BASF Co., Ltd.).

Film 2 containing a hardcoat layer as the long-sized optical film manufactured by the aforementioned method and Film 2 were prepared, and the adhesive bond for a polarizing plate was coated on the two films using a microgravure coater (gravure roll: #300, rotation speed 140%/line speed) such that the thickness was 5 μm, thereby manufacturing optical films containing an adhesive bond. Subsequently, the optical film containing the adhesive bond was adhered to both surfaces of the polarizer by roll-to-roll by means of a roll machine such that the polarizer having a film thickness of 20 μm was sandwiched between the two films containing the adhesive bond. A polarizing plate on the front side of Liquid Crystal Display Device 2 to be described below in Table 2 was manufactured by irradiating UV rays on optical film sides (both sides) adhered. Meanwhile, the line speed and the light quantity of the ultraviolet rays were set to 20 m/min and 300 mJ/cm$^2$, respectively. Here, the transmission axis of the polarizer and the conveying direction of the film were disposed so as to be orthogonal to each other. Likewise, a polarizing plate on the rear side of Liquid Crystal Display Device 2 to be described below in Table 2 was manufactured in the same manner as in the manufacture of the polarizing plate on the front side except that Film 2 was used instead of Film 2 containing a hardcoat layer.

[Manufacture of Polarizing Plate Used in Liquid Crystal Display Devices 1, 3 to 9, 11 to 18 and 20 to 38]

Polarizing plates on the front and rear sides of each liquid crystal display device were manufactured in the same manner as the polarizing plate used in Liquid Crystal Display Device 2, except that the film used in adhesion was changed into the combination described in the following Table 2 in the manufacture of the polarizing plate used in Liquid Crystal Display Device 2. Here, the transmission axis of the polarizer and the conveying direction of the film were disposed so as to be orthogonal to each other.

[Manufacture of Polarizing Plate Used in Liquid Crystal Display Device 10]

(Manufacture of Polarizing Plate Using Adhesion Method B)

Corona treatment was performed on the surfaces of Film 2 containing a hardcoat layer as the long-sized optical film manufactured by the aforementioned method and Film 2. Subsequently, two films subjected to corona treatment were adhered to both surfaces of the polarizer by roll-to-roll by means of a roll machine using a polyvinyl alcohol-based adhesive bond, such that the polarizer having a film thickness of 20 μm was sandwiched between the two films, and were dried at 70° C. for 10 minutes or more to manufacture a polarizing plate on the front side of Liquid Crystal Display Device 10 to be described below in Table 2. Here, the transmission axis of the polarizer and the conveying direction of the film were disposed so as to be orthogonal to each other. Likewise, a polarizing plate on the rear side of Liquid Crystal Display Device 10 to be described below in Table 2 was manufactured in the same manner as in the manufacture of the polarizing plate on the front side except that Film 2 was used instead of Film 2 containing a hardcoat layer.

(Manufacture of Polarizing Plate Used in Liquid Crystal Display Device 19)

[Saponification of Film]

After Film 12 containing a hardcoat layer as a long-sized optical film manufactured by the aforementioned method and Film 12 were prepared and immersed in a 1.5 mol/L aqueous NaOH solution (saponification solution) kept at 55° C. for 2 minutes, the films were washed with water, immersed in a 0.05 mol/L aqueous sulfuric acid solution at 25° C. for 30 seconds, and then further allowed to pass through a washing bath under running water for 30 seconds to make the film neutral. Then, dehydration was repeated three times with an air knife, water was dropped on the films, and then the films were allowed to stay in a drying zone at 70° C. for 15 seconds to dry the films, thereby preparing saponified films.

The surface of Film 2 as the long-sized optical film manufactured by the aforementioned method was subjected to corona treatment. Subsequently, Film 12 having a hardcoat layer subjected to saponification treatment and Film 2 subjected to corona treatment were adhered to both surfaces of the polarizer by roll-to-roll by means of a roll machine using a polyvinyl alcohol-based adhesive bond, such that the polarizer having a film thickness of 20 μm was sandwiched between the two films, and were dried at 70° C. for 10 minutes or more to manufacture a polarizing plate on the front side of Liquid Crystal Display Device 19 to be described below in Table 2. Here, the transmission axis of the polarizer and the conveying direction of the film were disposed so as to be orthogonal to each other. Likewise, a polarizing plate on the rear side of Liquid Crystal Display Device 19 to be described below in Table 2 was manufactured in the same manner as in the manufacture of the polarizing plate on the front side except that Film 12 subjected to saponification treatment was used instead of Film 12 containing a hardcoat layer, which was subjected to saponification treatment.

[Manufacture of Liquid Crystal Display Devices 1 to 32]

Two polarizing plates were peeled off from a commercially available IPS-mode liquid crystal television set (42LS5600 manufactured by LG Electronics Corp.), and each of the polarizing plates manufactured above were bonded to the front side and the rear side in combination described in the following Table 2 through an adhesive. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of the glass used in the liquid crystal cell was 0.5 mm. In the manner as described above, Liquid Crystal Display Devices 1 to 32 with the configuration shown in the following Table 2 were manufactured.

[Manufacture of Liquid Crystal Display Devices 33 to 38]

Two polarizing plates were peeled off from a commercially available VA-mode liquid crystal television set (39E61HR manufactured by Skyworth), and each of the polarizing plates manufactured above were bonded to the front side and the rear side in combination described in the following Table 2 through an adhesive. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of the glass used in the liquid crystal cell was 0.5 mm. In the manner as described above, Liquid Crystal Display Devices 33 to 38 with the configuration shown in the following Table 2 were manufactured.

<Evaluation of Liquid Crystal Display Device>

(Evaluation of Display Unevenness)

After thermo treatment at 50° C. and a relative humidity of 80% for 72 hours, the liquid crystal display device manufactured was allowed to stand at 25° C. and a relative humidity of 60% for 2 hours, and then a backlight of the liquid crystal display device was lit, and 10 hours after the lighting, light leakage at the four corners of the panel was evaluated in a dark room and compared with that of the reference panel to use the resulting evaluation as an evaluation of display unevenness.

A black display image was captured from the image front surface by a camera for measuring luminance intensity "ProMetric" (manufactured by Radiant Imaging, Inc.), and by calculating a difference between the average luminance intensity of the entire screen and a luminance intensity where light leakage on the four corners was at the maximum value, a difference ($\Delta L$) in light leakage between the evaluation panel and the reference panel was quantified by the following equation.

$$\Delta L = \text{(light leakage of the reference panel)} - \text{(light leakage of the evaluation panel)}$$

The evaluation results and the reference panel which is compared with each liquid crystal display device are described in the following Table 2.

A: The difference in light leakage from the reference panel can be visually recognized more clearly, and the effect of reducing light leakage is more significant (0.04 cd/m$^2$<$\Delta L$) than that of the reference panel.

B: The difference in light leakage from the reference panel can be visually recognized clearly, and the effect of reducing light leakage is significant (0.03 cd/m$^2$<$\Delta L$) as compared to the reference panel.

C: The difference in light leakage from the reference panel can be visually recognized slightly, and the effect of reducing light leakage is scarcely found (0.01 cd/m$^2$<$\Delta L$<0.03 cd/m$^2$) as compared to the reference panel.

D: The difference in light leakage from the reference panel cannot be visually recognized, and the effect of reducing light leakage for the reference panel cannot be confirmed ($\Delta L$<0.01 cd/m$^2$) as compared to the reference panel.

(2) Evaluation of Warpage of Liquid Crystal Cell

After thermo treatment at 50° C. and a relative humidity of 80% for 72 hours, the liquid crystal display device manufactured was allowed to stand at 25° C. and a relative humidity of 60% for 2 hours, and then a backlight of the liquid crystal display device was lit, and 10 hours after the lighting, the liquid crystal display device was disassembled to take out a liquid crystal cell from the device. The warpage shape of the liquid crystal cell was a concave on the viewing side in the longitudinal direction. Subsequently, the liquid crystal cell was fixed in a vertical placement state, and the amount of warpage in the longitudinal direction of the liquid crystal cell was evaluated using a laser displacement meter. In addition, the warpage reduction rate with respect to the reference panel was calculated from the amount of warpage by the following equation. The evaluation results and the reference panel which is compared with each liquid crystal display device are described in the following Table 2.

Warpage Reduction Rate(%)=(amount of warpage of evaluation panel)/(amount of warpage of reference panel)×100

(3) Evaluation of Display Performance (3)-1 Viewing angle contrast (Contrast in Oblique direction) A meter (BM5A, manufactured by TOPCON Co., Ltd.) was used to calculate viewing angle contrasts (white brightness/black brightness) by measuring black display and white display brightness values in the azimuth directions of 45 degrees and 135 degrees in a polar angle direction of 60 degrees from the front surface of the device in a dark room. With an average value of viewing angle contrasts in the two azimuth directions of 45 degrees and 135 degrees, the viewing angle contrast of the liquid crystal display device was evaluated. Furthermore, various images were displayed to sensually evaluate the visibility from the front surface of the device to a polar angle direction of 60 degrees with respect to the two azimuth directions of 45 degrees and 135 degrees.

A: The contour of the image can be visually recognized clearly even in an oblique direction. (The viewing angle contrast is 15 or more)

B: The contour of the image is not clear in a polar angle direction of 45 degrees or more, but the contour of the image is clear up to a polar angle direction of 45 degrees, so that there is practically no problem (the viewing angle contrast is 10 or more and less than 15)

C: Since the contour of the image is not clear in a polar angle direction of 45 degrees, there is practically a problem in some cases.

(3)-2 Viewing Angle Tint (Black Tint in Oblique Direction)

In a dark room, in a polar angle direction of 60 degrees from the front surface of the device, the tint of black display in an azimuth direction from 0 degree to 360 degrees was sensually evaluated. When yellow and green were incorporated into a change in black tint, display quality significantly deteriorates, and accordingly, the following establishment was adopted as the determination criteria of the sensual evaluation.

A: The black tint is changing from blue to red, and is acceptable as a display quality.

B: Yellow or green is incorporated into the black tint, and the display quality is significantly bad.

In the following Table 2, "-" in the display performance column indicates that the evaluation has not been made.

TABLE 2

| | | Polarizing Plate on Front Side | | | | |
|---|---|---|---|---|---|---|
| | Display Layer | Protective Film on Viewing Side | Protective Film on Cell Side | Adhesion Method | Liquid Crystal Cell | |
| C. Ex. | Liquid Crystal Display Device 1 | Hardcoat layer | Film 1 | Film 1 | A | 42L5600 mfg. by LG |
| C. Ex. | Liquid Crystal Display Device 9 | Hardcoat layer | Film 19 | Film 19 | A | 42L5600 mfg. by LG |
| Ex. | Liquid Crystal Display Device 2 | Hardcoat layer | Film 2 | Film 2 | A | 42L5600 mfg. by LG |
| Ex. | Liquid Crystal Display Device 10 | Hardcoat layer | Film 2 | Film 2 | B | 42L5600 mfg. by LG |
| Ex. | Liquid Crystal Display Device 3 | Hardcoat layer | Film 3 | Film 3 | A | 42L5600 mfg. by LG |
| Ex. | Liquid Crystal Display Device 4 | Hardcoat layer | Film 4 | Film 4 | A | 42L5600 mfg. by LG |
| C. Ex. | Liquid Crystal Display Device 11 | Hardcoat layer | Film 5 | Film 5 | A | 42L5600 mfg. by LG |
| Ex. | Liquid Crystal Display Device 12 | Hardcoat layer | Film 6 | Film 6 | A | 42L5600 mfg. by LG |
| C. Ex. | Liquid Crystal Display Device 13 | Hardcoat layer | Film 7 | Film 7 | A | 42L5600 mfg. by LG |
| Ex. | Liquid Crystal Display Device 14 | Hardcoat layer | Film 8 | Film 8 | A | 42L5600 mfg. by LG |
| Ex. | Liquid Crystal Display Device 15 | Hardcoat layer | Film 9 | Film 9 | A | 42L5600 mfg. by LG |
| Ex. | Liquid Crystal Display Device 16 | Hardcoat layer | Film 10 | Film 10 | A | 42L5600 mfg. by LG |
| Ex. | Liquid Crystal Display Device 17 | Hardcoat layer | Film 11 | Film 11 | A | 42L5600 mfg. by LG |
| C. Ex. | Liquid Crystal Display Device 5 | Hardcoat layer | Film 12 | Film 1 | A | 42L5600 mfg. by LG |
| C. Ex. | Liquid Crystal Display Device 18 | Hardcoat layer | Film 12 | Film 19 | A | 42L5600 mfg. by LG |
| Ex. | Liquid Crystal Display Device 6 | Hardcoat layer | Film 12 | Film 2 | A | 42L5600 mfg. by LG |
| Ex. | Liquid Crystal Display Device 19 | Hardcoat layer | Film 12 | Film 2 | B | 42L5600 mfg. by LG |
| Ex. | Liquid Crystal Display Device 7 | Hardcoat layer | Film 12 | Film 3 | A | 42L5600 mfg. by LG |
| Ex. | Liquid Crystal Display Device 8 | Hardcoat layer | Film 12 | Film 4 | A | 42L5600 mfg. by LG |
| C. Ex. | Liquid Crystal Display Device 20 | Hardcoat layer | Film 12 | Film 5 | A | 42L5600 mfg. by LG |
| Ex. | Liquid Crystal Display Device 21 | Hardcoat layer | Film 12 | Film 6 | A | 42L5600 mfg. by LG |
| C. Ex. | Liquid Crystal Display Device 22 | Hardcoat layer | Film 12 | Film 7 | A | 42L5600 mfg. by LG |
| Ex. | Liquid Crystal Display Device 23 | Hardcoat layer | Film 12 | Film 8 | A | 42L5600 mfg. by LG |
| Ex. | Liquid Crystal Display Device 24 | Hardcoat layer | Film 12 | Film 9 | A | 42L5600 mfg. by LG |
| Ex. | Liquid Crystal Display Device 25 | Hardcoat layer | Film 12 | Film 10 | A | 42L5600 mfg. by LG |
| Ex. | Liquid Crystal Display Device 26 | Hardcoat layer | Film 12 | Film 11 | A | 42L5600 mfg. by LG |
| C. Ex. | Liquid Crystal Display Device 27 | Hardcoat layer | Film 13 | Film 1 | A | 42L5600 mfg. by LG |
| Ex. | Liquid Crystal Display Device 28 | Hardcoat layer | Film 13 | Film 2 | A | 42L5600 mfg. by LG |
| C. Ex. | Liquid Crystal Display Device 29 | Hardcoat layer | Film 14 | Film 1 | A | 42L5600 mfg. by LG |
| Ex. | Liquid Crystal Display Device 30 | Hardcoat layer | Film 14 | Film 2 | A | 42L5600 mfg. by LG |
| C. Ex. | Liquid Crystal Display Device 31 | Hardcoat layer | Film 1 | Film 15 | A | 42L5600 mfg. by LG |
| Ex. | Liquid Crystal Display Device 32 | Hardcoat layer | Film 2 | Film 15 | A | 42L5600 mfg. by LG |
| C. Ex. | Liquid Crystal Display Device 33 | Hardcoat layer | Film 1 | Film 16 | A | 39E61HR mfg. by Skyworth |
| Ex. | Liquid Crystal Display Device 34 | Hardcoat layer | Film 2 | Film 16 | A | 39E61HR mfg. by Skyworth |
| C. Ex. | Liquid Crystal Display Device 35 | Hardcoat layer | Film 1 | Film 17 | A | 39E61HR mfg. by Skyworth |
| Ex. | Liquid Crystal Display Device 36 | Hardcoat layer | Film 2 | Film 17 | A | 39E61HR mfg. by Skyworth |
| C. Ex. | Liquid Crystal Display Device 37 | Hardcoat layer | Film 1 | Film 18 | A | 39E61HR mfg. by Skyworth |
| Ex. | Liquid Crystal Display Device 38 | Hardcoat layer | Film 2 | Film 18 | A | 39E61HR mfg. by Skyworth |

| | | Polarizing Plate on Rear Side | | | Evaluation of Liquid Crystal Display Device | | | | | |
|---|---|---|---|---|---|---|---|---|---|---|
| | | Protective Film on Cell Side | Protective Film on Light Source Side | Adhesion Method | Display Unevenness | Amount of Warpage [mm] | Reduction Rate [%] | Reference of Comparison | Viewing Angle Contrast | Tint |
| C. Ex. | Liquid Crystal Display Device 1 | Film 1 | Film 1 | A | D | 7.2 | — | — | A | A |
| C. Ex. | Liquid Crystal Display Device 9 | Film 19 | Film 19 | A | C | 7.0 | 97% | LCD Device 1 | A | A |
| Ex. | Liquid Crystal Display Device 2 | Film 2 | Film 2 | A | B | 6.8 | 95% | LCD Device 1 | A | A |
| Ex. | Liquid Crystal Display Device 10 | Film 2 | Film 2 | B | B | 6.8 | 95% | LCD Device 1 | A | A |
| Ex. | Liquid Crystal Display Device 3 | Film 3 | Film 3 | A | B | 6.6 | 92% | LCD Device 1 | A | A |
| Ex. | Liquid Crystal Display Device 4 | Film 4 | Film 4 | A | A | 6.5 | 91% | LCD Device 1 | A | A |
| C. Ex. | Liquid Crystal Display Device 11 | Film 5 | Film 5 | A | D | 7.2 | — | — | A | A |
| Ex. | Liquid Crystal Display Device 12 | Film 6 | Film 6 | A | B | 6.8 | 95% | LCD Device 11 | A | A |
| C. Ex. | Liquid Crystal Display Device 13 | Film 7 | Film 7 | A | D | 6.6 | — | — | A | A |
| Ex. | Liquid Crystal Display Device 14 | Film 8 | Film 8 | A | B | 6.3 | 95% | LCD Device 13 | B | B |
| Ex. | Liquid Crystal Display Device 15 | Film 9 | Film 9 | A | B | 6.2 | 94% | LCD Device 13 | A | B |
| Ex. | Liquid Crystal Display Device 16 | Film 10 | Film 10 | A | B | 6.1 | 92% | LCD Device 13 | A | A |
| Ex. | Liquid Crystal Display Device 17 | Film 11 | Film 11 | A | A | 5.8 | 88% | LCD Device 13 | A | A |
| C. Ex. | Liquid Crystal Display Device 5 | Film 1 | Film 12 | A | D | 8.2 | — | — | A | A |
| C. Ex. | Liquid Crystal Display Device 18 | Film 19 | Film 12 | A | C | 8.1 | 98% | LCD Device 5 | A | A |
| Ex. | Liquid Crystal Display Device 6 | Film 2 | Film 12 | A | B | 7.8 | 95% | LCD Device 5 | A | A |
| Ex. | Liquid Crystal Display Device 19 | Film 2 | Film 12 | B | B | 7.8 | 95% | LCD Device 5 | A | A |

TABLE 2-continued

| | | | | | | | | | | |
|---|---|---|---|---|---|---|---|---|---|---|
| Ex. | Liquid Crystal Display Device 7 | Film 3 | Film 12 | A | B | 7.6 | 93% | LCD Device 5 | A | A |
| Ex. | Liquid Crystal Display Device 8 | Film 4 | Film 12 | A | A | 7.5 | 91% | LCD Device 5 | A | A |
| C. Ex. | Liquid Crystal Display Device 20 | Film 5 | Film 12 | A | D | 8.2 | — | — | A | A |
| Ex. | Liquid Crystal Display Device 21 | Film 6 | Film 12 | A | B | 7.8 | 95% | LCD Device 20 | A | A |
| C. Ex. | Liquid Crystal Display Device 22 | Film 7 | Film 12 | A | D | 7.7 | — | — | A | A |
| Ex. | Liquid Crystal Display Device 23 | Film 8 | Film 12 | A | B | 7.3 | 95% | LCD Device 22 | B | B |
| Ex. | Liquid Crystal Display Device 24 | Film 9 | Film 12 | A | B | 7.1 | 93% | LCD Device 22 | A | B |
| Ex. | Liquid Crystal Display Device 25 | Film 10 | Film 12 | A | A | 7.0 | 91% | LCD Device 22 | A | A |
| Ex. | Liquid Crystal Display Device 26 | Film 11 | Film 12 | A | A | 6.7 | 87% | LCD Device 22 | A | A |
| C. Ex. | Liquid Crystal Display Device 27 | Film 1 | Film 13 | A | D | 4.1 | — | — | A | A |
| Ex. | Liquid Crystal Display Device 28 | Film 2 | Film 13 | A | B | 3.9 | 95% | LCD Device 27 | A | A |
| C. Ex. | Liquid Crystal Display Device 29 | Film 1 | Film 14 | A | D | 4.5 | — | — | A | A |
| Ex. | Liquid Crystal Display Device 30 | Film 2 | Film 14 | A | B | 4.2 | 94% | LCD Device 29 | A | A |
| C. Ex. | Liquid Crystal Display Device 31 | Film 15 | Film 1 | A | D | 7.4 | — | — | A | A |
| Ex. | Liquid Crystal Display Device 32 | Film 15 | Film 2 | A | B | 7.0 | 95% | LCD Device 31 | A | A |
| C. Ex. | Liquid Crystal Display Device 33 | Film 16 | Film 1 | A | D | 7.1 | — | — | — | — |
| Ex. | Liquid Crystal Display Device 34 | Film 16 | Film 2 | A | B | 6.7 | 94% | LCD Device 33 | — | — |
| C. Ex. | Liquid Crystal Display Device 35 | Film 17 | Film 1 | A | D | 7.1 | — | — | — | — |
| Ex. | Liquid Crystal Display Device 36 | Film 17 | Film 2 | A | B | 6.7 | 94% | LCD Device 35 | — | — |
| C. Ex. | Liquid Crystal Display Device 37 | Film 18 | Film 1 | A | D | 3.7 | — | — | — | — |
| Ex. | Liquid Crystal Display Device 38 | Film 18 | Film 2 | A | B | 3.5 | 95% | LCD Device 37 | — | — |

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A polarizing plate comprising:
   a polarizer; and
   an optical film comprising:
      an acrylic resin,
      wherein a tensile elastic modulus in a machine direction, which is abbreviated as an MD direction, and a tensile elastic modulus in a direction perpendicular to the machine direction, which is abbreviated as a TD direction, satisfy a relationship of Equation (1):

$$1.36 < \text{Tensile Elastic Modulus in the MD Direction} / \text{Tensile Elastic Modulus in the TD Direction} < 1.80, \quad \text{Equation (1)}$$

wherein a mass ratio of the acrylic resin to other resins in the optical film is 98:2 to 100:0, and
   wherein the other resins are not cellulose esters,
   wherein a weight average molecular weight of the acrylic resin is 50,000 to 500,000,
   wherein the polarizer and the optical film are laminated with a curable adhesive bond composition, and
   wherein the optical film is on at least one surface of the polarizer.

2. The polarizing plate according to claim 1, wherein the tensile elastic modulus of the optical film in the MD direction is $1.70 \times 10^9$ to $5.5 \times 10^9$ N/m², and the tensile elastic modulus of the optical film in the TD direction is $1.2 \times 10^9$ to $4.0 \times 10^9$ N/m².

3. The polarizing plate according to claim 1, wherein an in-plane retardation value Re of the optical film, represented by Equation (i), and a retardation value in a thickness-direction Rth of the optical film, represented by Equation (ii), satisfy Equation (iii) and Equation (iv):

$$Re = (nx - ny) \times d; \quad \text{(i)}$$

$$Rth = ((nx + ny)/2 - nz) \times d; \quad \text{(ii)}$$

$$0 \leq Re < 20; \quad \text{(iii)}$$

$$|Rth| \leq 25, \quad \text{(iv)}$$

wherein nx is a refractive index in an in-plane slow axis direction of the optical film,
ny is a refractive index in an in-plane fast axis direction of the optical film,
nz is a refractive index in a thickness-direction of the optical film, and
d is a thickness (nm) of the optical film.

4. The polarizing plate according to claim 1, wherein at least one layer of a pattern phase difference layer, a λ/4 layer, an optically anisotropic layer, a hardcoat layer, an antiglare layer, an antireflection layer, an antistatic layer or an adhesive layer is provided on a surface of the optical film.

5. The polarizing plate according to claim 1, which satisfies a relationship of "1.42<Tensile elastic modulus in MD direction/Tensile elastic modulus in TD direction<1.80".

6. The polarizing plate according to claim 1, wherein the optical film is on both surfaces of the polarizer.

7. A liquid crystal display device comprising at least one polarizing plate according to claim 6.

8. A liquid crystal display device comprising at least one polarizing plate according to claim 1.

9. The polarizing plate according to claim 1, wherein the weight average molecular weight of the acrylic resin is 50,000 to 133,000.

* * * * *